United States Patent [19]
Yamanaka et al.

[11] Patent Number: 5,832,040
[45] Date of Patent: Nov. 3, 1998

[54] PHASE DETECTOR

[75] Inventors: Kazuya Yamanaka; Shuji Murakami; Jun Ido; Takashi Fujiwara, all of Tokyo, Japan

[73] Assignee: Mitsubishi Denki Kabushiki Kaisha, Tokyo, Japan

[21] Appl. No.: 815,573

[22] Filed: Mar. 12, 1997

[30] Foreign Application Priority Data

Sep. 12, 1996  [JP]  Japan .................................. 8-241547

[51] Int. Cl.⁶ ................................................. H04L 27/38
[52] U.S. Cl. .......................... 375/326; 375/327; 375/332; 375/344; 329/307
[58] Field of Search .................................. 375/226, 281, 375/324–327, 329, 332, 344; 329/304, 306–308

[56] References Cited

U.S. PATENT DOCUMENTS

| | | | |
|---|---|---|---|
| 5,400,366 | 3/1995 | Iwamatsu | 375/344 |
| 5,418,815 | 5/1995 | Ishikawa et al. | 375/216 |
| 5,440,587 | 8/1995 | Ishikawa et al. | 375/332 |
| 5,465,271 | 11/1995 | Hladik et al. | 375/267 |
| 5,533,068 | 7/1996 | Muto | 375/344 |
| 5,608,764 | 3/1997 | Sugita et al. | 375/344 |
| 5,614,861 | 3/1997 | Harada | 329/308 |
| 5,754,591 | 5/1998 | Samueli et al. | 375/235 |

FOREIGN PATENT DOCUMENTS

| | | |
|---|---|---|
| 2-149155 | 6/1990 | Japan . |
| 5-347643 | 12/1993 | Japan . |
| 6-30072 | 2/1994 | Japan . |

*Primary Examiner*—Young T. Tse
*Attorney, Agent, or Firm*—Burns, Doane, Swecker & Mathis. LLP

[57] ABSTRACT

It is an object to enlarge the phase range in which a phase error can be determined. An operating block (1) calculates a power of carriers from data DI and DQ. An ideal symbol estimating block (2a) outputs a plurality of ideal symbols which correspond to the power of carriers outputted from the operating block (1). A phase error tan(θ) calculating block (2b) calculates prediction phase errors between the ideal symbols and the symbol given by the data DI and DQ. A phase error determining block (3) determines a phase error from among the prediction phase errors outputted from the phase error tan(θ) calculating block and outputs the phase error.

17 Claims, 30 Drawing Sheets

FIG. 23

| | tan(-π/4) | | | | tan(0) | | | | | | | | | | tan(π/4) |
|---|---|---|---|---|---|---|---|---|---|---|---|---|---|---|---|
| | A | B | C | D | E | F | G | H | I | J | K | L | M | N | O | P |
| φ'i | 0 | 0 | 0 | 0 | 0 | 1 | 0 | 1 | 0 | 0 | 0 | 0 | 0 | 0 | 0 | 0 |
| φi | 1 | 0 | 0 | 0 | 1 | 0 | 0 | 1 | 0 | 1 | 0 | 0 | 0 | 0 | 0 | 0 |

FIG. 24

| | tan(−π/4) | | | | | | | | tan(0) | | | | | | | | tan(π/4) |
|---|---|---|---|---|---|---|---|---|---|---|---|---|---|---|---|---|---|
| | A | B | C | D | E | F | G | H | I | J | K | L | M | N | O | P |
| $\phi'_i$ | D | D | D | D | D | D | D | D | D | D | D | D | D | D | D | D |
| $\phi_i$ | 1 | D | D | D | 1 | D | D | 1 | D | 1 | D | D | D | D | D | D |

F I G. 4 1
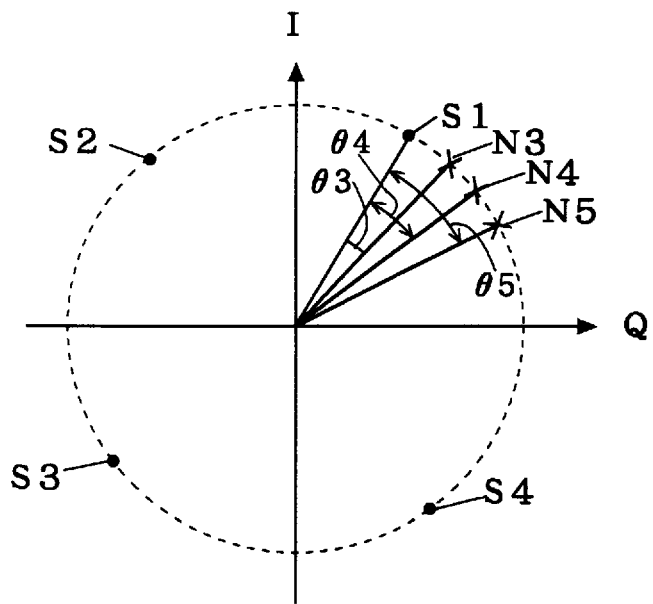
F I G. 4 2
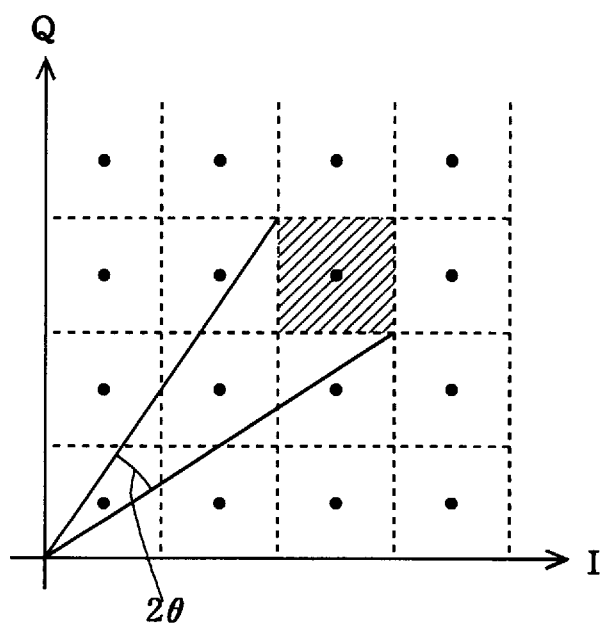

5,832,040

PHASE DETECTOR

BACKGROUND OF THE INVENTION

1. Field of the Invention

The present invention relates to phase detectors, and particularly to a phase detector which is used in a carrier reproducing circuit of multiple phase modulation technique, quadrature amplitude phase modulation technique, etc.

2. Description of the Background Art

Recently, with the spread of equipments composed of digital circuits such as personal computers, digital data are intensively exchanged using communication networks. In communication services such as television broadcasting, services with digital communication techniques are coming in practice to enhance the efficiency of use of limited usable frequency bands. Such digital communication techniques often use quadrature amplitude modulation (hereinafter referred to as QAM.) The QAM converts digital data into amplitude and phase information by using orthogonal two functions, e.g., SIN function and COS function, and transmits the information. FIG. 38 provides a graph showing vector arrangement in 16 QAM in which in-phase and quadrature-phase signals are provided with four values. In FIG. 38, the I-axis shows amplitude of cosine wave, the in-phase component, the Q-axis shows amplitude of sine wave, the quadrature-phase component, and the angle θ shows phase. The signal points (hereinafter referred to as symbols) shown at black points in the figure represent synthetic vectors of the sine wave and the cosine wave. In 16 QAM, individual symbols, discrete-value signals transmitted at certain intervals, have 4-bit information.

FIG. 36 provides a block diagram showing the structure of a common carrier reproducing circuit for quadrature amplitude modulation wave (referred to as a QAM demodulator.) The modulation wave IN inputted to the data input terminal of the carrier reproducing circuit, which has already passed through an analogue-digital converter, is a modulation wave in the form of digital value, and all the following operating processings shall be performed in digital circuits.

The input modulation wave IN is first detected in multipliers 10 and 11 with local oscillation signals each having waveform of sine wave and cosine wave outputted from a local oscillator with a fixed frequency and separated into two orthogonal components, the I-axis and Q-axis components. The detection outputs are respectively inputted to two low-pass filters (hereinafter referred to as LPF) 12 and 13 having the same frequency characteristic and spectrum-shaped.

The LPFs 12 and 13 are roll-off filters or root roll-off filters for forming transmission characteristics required to prevent inter-symbol interference in digital data transmission, which are generally designed to provide raised cosine characteristics causing no inter-symbol interference when combined with filter characteristics on the transmission side.

The outputs of the LPFs 12 and 13 are inputted to a derotator 14. The derotator 14 is a complex multiplier, which is fed with sine-based and cosine-based data conversion signals from a numerical control oscillator (hereinafter referred to as NCO) 15 and corrects phase delay and frequency offset of the input modulation wave IN. The derotator 14 has the structure shown in FIG. 44, for example. In FIG. 44, 120 denotes a multiplier for performing multiplication of cosθ and signal ori, 121 denotes a multiplier for performing multiplication of sinθ and signal orq, 122 denotes a multiplier for performing multiplication of cosθ and signal orq, 123 denotes a multiplier for performing multiplication of sinθ and signal ori, 124 denotes a subtracter for subtracting the output of the multiplier 121 from the output of the multiplier 120, and 125 denotes an adder for performing addition of the output of the multiplier 122 and the output of the multiplier 123.

The synthetic signal of the output signals idd and qdd is rotated through θ with respect to the synthetic signal of the input signals ori and orq.

The outputs of the derotator 14 are inputted to a decoder 16 for converting symbol information into bit string and a phase detector 17. The phase detector 17 predicts an ideal symbol for each input symbol information according to the algorithm described later and detects a phase error between the ideal symbol and the actually-received symbol. The detected phase error is smoothed in a loop-filter 18 and inputted to the frequency control terminal of the NCO 15. The NCO 15 produces a signal having frequency proportional to the inputted digital signal and it also has a function of data conversion, which is a circuit for outputting the sine-based signal and the cosine-based signal as digital signals. The sine-based and cosine-based outputs provided from the NCO 15 are supplied to the derotator 14 as information for correcting phase delay and frequency offset of the modulation wave IN inputted. The outputs of the decoder, which converts symbol information into bit string at the time when remaining frequency error and phase error are eliminated from outputs of the derotator 14, are the same data as the digital data transmitted, completely demodulated.

Next, the conventional phase detector will be explained. FIG. 37 is a block diagram showing the structure of a conventional phase detector. FIG. 39 shows the relation between the phase error determination and threshold values in the case of 16 QAM. In FIG. 39, the threshold values are on the lines at equal distances from adjacent symbols and the regions surrounded by the threshold values around individual symbols correspond to determination regions for the individual symbols. The dotted lines in FIG. 39 represent the lines connecting the threshold values and the shadowed region shows the determination region for the correct symbol CS. In FIG. 39, the actually-received symbol GS is out of the region for the correct symbol CS and therefore a phase error (θ1−θ2) is obtained with respect to the wrong symbol WS.

A region determining circuit 20 determines in which region input symbol information containing frequency error and phase error exists.

FIG. 40 provides a graph for explaining phase errors. The graph shows symbols in 4 QAM. In FIG. 40, S1 to S4 represent ideal symbols and N1 and N2 represent successive actually-received symbols. In the case of a phase error, the phase difference θ1 between the actually-received symbol N1 and the ideal symbol S1 is considered to be almost the same as the phase difference θ2 between the actually-received symbol N2, which follows the symbol N1, and the symbol S4.

As shown in FIG. 41, however, in the case where signals indicative of the ideal symbol S1 are continuously inputted, for example, if a frequency error is taking place, the phase differences θ3 to θ5 between the actually-received symbols N3 to N5 and the ideal symbol S1 gradually become larger or smaller. The frequency ω of this rotating symbol is equal to (θ4−θ3)/T or (θ5−θ4)/T.

Table 1 shows relation between continuously inputted symbols and the phase errors and the frequency errors. As can be seen from Table 1, distinguishing between a frequency error and a phase error requires comparison between phase differences of a plurality of input symbols.

|  | n = 1 | n = 2 | n = 3 | n = 4 |
|---|---|---|---|---|
| Phase error | θ | θ | θ | θ |
| Frequency error | θ1 | θ2 | θ3 | θ4 |

After a region is determined, a phase difference between an ideal symbol at the coordinates (α, β) and an actually-received symbol at the coordinates (i, q) is calculated by a phase error calculating circuit 21. The phase difference θ via corresponds to a difference between the angle θ1 to the ideal symbol with respect to the I-axis and the angle θ2 to the actually-received symbol with respect to the I-axis. That is to say, it is expressed by equation 1 below.

Obtaining an arc tangent of the value on the right member in equation 1 provides a desired phase error θ.

$$\tan\theta = \tan(\theta 1 - \theta 2) = \frac{Bi - Aq}{Ai + Bq} \quad (1)$$

This way, in the conventional phase detector, correctly estimating an ideal symbol requires that the actually-received symbol should be in the region surrounded by threshold values. If the actually-received symbol is out of the region containing the symbol CS originally intended on the transmission side, as shown in FIG. 39, a phase error is obtained with respect to a symbol WS different from the symbol CS intended on the transmission side. This results in the problem that a correct phase error θ can not be obtained with input signals having a large frequency error or a large phase error.

Furthermore, when the number of symbols increases, like 16 QAM, 64 QAM, and 256 QAM, threshold regions including ideal symbols become smaller and smaller as shown in FIG. 42 or FIG. 43. As the threshold regions thus become smaller, the determinable phase difference θ becomes smaller, leading to the problem that the ranges of processable frequency errors and phase errors become smaller and smaller.

SUMMARY OF THE INVENTION

According to a first aspect of the present invention, a phase detector comprises: ideal symbol estimating means for estimating, from a power of a carrier or an amplitude of the carrier transmitting a signal, to which ideal symbol an actually-received symbol transmitted by the carrier corresponded at the time of transmission; prediction phase detecting means for obtaining a plurality of prediction phase errors from a plurality of ideal symbols estimated to be those at the time of transmission by the ideal symbol estimating means and the actually-received symbol; and phase error determining means for determining a phase error to be outputted as a phase error for an actually-transmitted symbol from among the plurality of prediction phase errors obtained by the prediction phase detecting means.

Preferably, according to a second aspect of the present invention, in the phase detector, the carrier includes first and second carriers orthogonal to each other and the phase detector further comprises operating means for calculating, from data about the first and second carriers, a power of the carriers or an amplitude of the carriers which is provided to the ideal symbol estimating means.

Preferably, according to a third aspect of the present invention, in the phase detector, the ideal symbol estimating means comprises storage means storing data about ideal symbols corresponding to the powers of the carriers or the amplitudes of the carriers at addresses corresponding to the powers or amplitudes, wherein the data about the ideal symbol corresponding to the power of the carriers or the amplitude of the carriers outputted from the operating means is directly outputted from the storage means.

Preferably, according to a fourth aspect of the present invention, the phase detector further comprises nearby point determining means for converting the power of the carriers or the amplitude of the carriers of the actually-received symbol outputted from the operating means into a power of carriers or an amplitude of carriers of an ideal symbol which is the closest to the power of the carriers or the amplitude of the carriers of the actually-received symbol.

Preferably, according to a fifth aspect of the present invention, in the phase detector, the prediction phase detecting means limits the range of the prediction phase errors in the range of not less than $(-\pi/4)$ and not more than $(\pi/4)$, seen from the actually-received symbol.

Preferably, according to a sixth aspect of the present invention, in the phase detector, the prediction phase detecting means comprises phase error calculating means which, when the coordinates of an ideal symbol estimated by the ideal symbol estimating means are taken as (A, B) and the coordinates of the actually-received symbol are taken as (i, q) (where A, B, i, q are absolute values), calculates ((Axi−Bxq)/(Axi+Bxq)) and ((Axq−Bxi)/(Axi+Bxq)), and if a result of the calculation is larger than 1, takes a reciprocal of the result and multiplies the reciprocal by −1 to calculate a phase error.

Preferably, according to a seventh aspect of the present invention, in the phase detector, the prediction phase detecting means comprises comparing means for calculating the numerators and the denominators of ((Axi−Bxq)/(Axi+Bxq)) and ((Axq−Bxi)/(Axi+Bxq)) and comparing the numerators and the denominators in magnitude, dividing means for performing division with the numerators and the denominators of the expressions exchanged so that the result of the calculation provides an output not larger than 1 according to the result of the comparison by the comparing means, and sign inverting means for inverting the sign of the output of the dividing means.

Preferably, according to an eighth aspect of the present invention, in the phase detector, the prediction phase detecting means comprises a calculating portion for calculating ((Axi−Bxq)/(Axi+Bxq)), wherein the values of A and B are exchanged and outputted to the calculating portion to calculate two kinds of prediction phase errors.

Preferably, according to a ninth aspect of the present invention, in the phase detector, the phase error calculating means performs operation at a rate twice, or more, that of inputting the data about the plurality of ideal symbols and the data about the actually-received symbol to perform calculations of the plurality of symbols in series.

Preferably, according to a tenth aspect of the present invention, in the phase detector, the phase error determining means compares prediction phase errors obtained at different times, among the plurality of prediction phase errors outputted from the prediction phase detecting means, to output a prediction phase error having the smallest difference between prediction phase errors as a phase error.

Preferably, according to an eleventh aspect of the present invention, in the phase detector, the phase error determining means detects a plurality of prediction phase errors at a plurality of different times in a plurality of regions obtained by dividing the range from $\pi/4$ to $-\pi/4$ into regions not larger than the minimum phase interval of the ideal symbols, allocates the plurality of prediction phase errors into the plurality of regions for each time, and compares states of the individual regions at successive times in which the plurality of prediction phase errors are allocated to determine a phase error.

Preferably, according to a twelfth aspect of the present invention, in the phase detector, the phase error determining means uses regions obtained by dividing the range from $\pi/4$ to $-\pi/4$ equally into 16 as the plurality of regions when the number of the ideal symbols is 256 or smaller.

Preferably, according to a thirteenth aspect of the present invention, in the is phase detector, the phase error determining means comprises a plurality of decoding means provided in correspondence with the plurality of regions, and further comprises region match determining means for setting flags for differentiation in the regions into which the prediction phase errors are allocated by decoding the plurality of prediction phase errors in the plurality of decoding means.

Preferably, according to a fourteenth aspect of the present invention, in the phase detector, the phase error determining means determines a phase error by using majority logic in which a region in which a flag is set for the longest time is selected and outputs a preceding determination result when a determination can not be made by the majority logic.

Preferably, according to a fifteenth aspect of the present invention, in the phase detector, the phase error determining means determines a phase error considering states of flags set in nearby regions as well.

Preferably, according to a sixteenth aspect of the present invention, in the phase detector, the phase error determining means determines a phase error by applying the majority logic considering states of flags in nearby regions when no region has the flags set at adjacent times.

Preferably, according to a seventeenth aspect of the present invention, in the phase detector, the phase error determining means is able to select whether to handle the largest region and the smallest region as adjacent regions or as distant regions when making a determination considering nearby regions.

According to the phase detector of the first aspect of the present invention, the ideal symbol estimating means estimates ideal symbols corresponding to an actually-received symbol on the basis of the power or amplitude of the carrier. Accordingly, when estimating the ideal symbols considered to be those at the time of transmission, the range in which each ideal symbol can be estimated is not limited by angle, providing the effect of enabling detection of larger phase errors as compared with conventional ones.

According to the phase detector of the second aspect, the operating means is able to calculate, from data about first and second carriers orthogonal to each other, the power or amplitude of the carriers, providing the effect of detecting phase errors of signals subjected to quadrature amplitude modulation.

According to the phase detector of the third aspect, data of ideal symbols previously stored in the storage means is read by using the power of carriers or the amplitude of carriers as addresses, providing the effect of simplifying the structure of the phase detector.

According to the phase detector of the fourth aspect, the nearby point determining means converts the power of carriers or the amplitude of carriers of an actually-received symbol outputted from the operating means into a power of carriers of an amplitude of carriers of a nearby ideal symbol. Therefore, even if the power or amplitude of carriers of the actually-received symbol does not coincide with that of an ideal symbol, the ideal symbol estimating means can estimate to which of ideal symbols it has corresponded at the time of transmission.

According to the phase detector of the fifth aspect, the prediction phase detecting means limits the range of prediction phase errors to not less than $(-\pi/4)$ and not more than $(\pi/4)$, seen from the actually-received symbol. This reduces the number of prediction phase errors, reducing the scale of the phase detector.

According to the phase detector of the sixth aspect, the phase error calculating means calculates ((Axi−Bxq)/(Axi+Bxq)) and ((Axq−Bxi)/(Axi+Bxq)). If a result of the calculation is larger than 1, it takes a reciprocal of the result and multiplies it by −1 to calculate the phase error. This reduces the part of calculating by using data, simplifying the structure of the phase error calculating means.

According to the phase detector of the seventh aspect, comparing the magnitudes of the numerators and denominators in the phase error calculating means reduces the number of divisions, simplifying the structure of the phase error calculating means.

According to the phase detector of the eighth aspect, the values of A and B are exchanged and outputted to the calculating portion. This enables one calculating portion to perform two kinds of calculations, which enables the structure of the phase error calculating means to be simplified.

According to the phase detector of the ninth aspect, the phase error calculating means is constructed to perform calculations of a plurality of symbols in series. Accordingly, the structure of the phase error calculating means can be simplified as compared with that for performing the calculations with a plurality of symbols in parallel, reducing the size of the phase detector.

According to the phase detector of the tenth aspect, the phase error determining means can determine a phase error by the simple means of comparing differences between the prediction phase errors.

According to the phase detector of the eleventh aspect, a comparison is made between differences of prediction phase errors according to which regions the prediction phase errors belong to. This simplifies the comparison, increasing the speed of determination in the phase error determining means and simplifying the structure of the phase error determining means.

According to the phase detector of the twelfth aspect, when the number of ideal symbols is 256 or less, the prediction phase errors are allocated by using the regions obtained by equally dividing the range between $\pi/4$ and $-\pi/4$ into 16. Therefore, in 256 QAM, the range can be divided at intervals not larger than the minimum phase interval between ideal symbols, with the minimum dividing number.

According to the phase detector of the thirteenth aspect, the prediction phase errors are allocated by decoding in the decoding means by using the values of the prediction phase errors. This provides the effect that the prediction phase errors can be allocated with simple structure.

According to the phase detector of the fourteenth aspect, the phase error determining means uses majority logic to increase the accuracy of the phase error determination.

According to the phase detector of the fifteenth aspect, the majority logic performed by the phase error determining means considers states in nearby regions as well. This increases the accuracy of the phase error determination.

According to the phase detector of the sixteenth aspect, the phase errors are determined considering states of flags in nearby regions as well. This lessens influence of variation of phase errors to increase the accuracy of the phase error determination.

According to the phase detector of the seventeenth aspect, it is possible, when making a determination considering nearby regions, to select whether to handle the largest region and the smallest region as adjacent regions or as distant regions. Therefore, when detecting a frequency error, for example, the accuracy of detection of rotating phase is increased by handling, the largest region and the smallest region as adjacent regions, adding to the functions of the phase detector.

The present invention has been made to solve the above problems, and an object of the present invention is to estimate ideal symbols from amplitude values of input signals without setting threshold regions between one ideal symbol and other symbols to keep high accuracy of detection of frequency errors and phase errors of the input signals irrespective of the number of symbols.

These and other objects, features, aspects and advantages of the present invention will become more apparent from the following detailed description of the present invention when taken in conjunction with the accompanying drawings.

BRIEF DESCRIPTION OF THE DRAWINGS

FIG. 23 is a diagram showing flags set in the regions to which the phase errors are allocated.

FIG. 24 is a diagram showing flags and disable signals set in the regions to which the phase errors are allocated.

FIG. 41 is a graph for describing frequency errors.

FIG. 42 is a graph for describing the threshold regions in the case of 64 QAM.

DESCRIPTION OF THE PREFERRED EMBODIMENT

Figure 1:
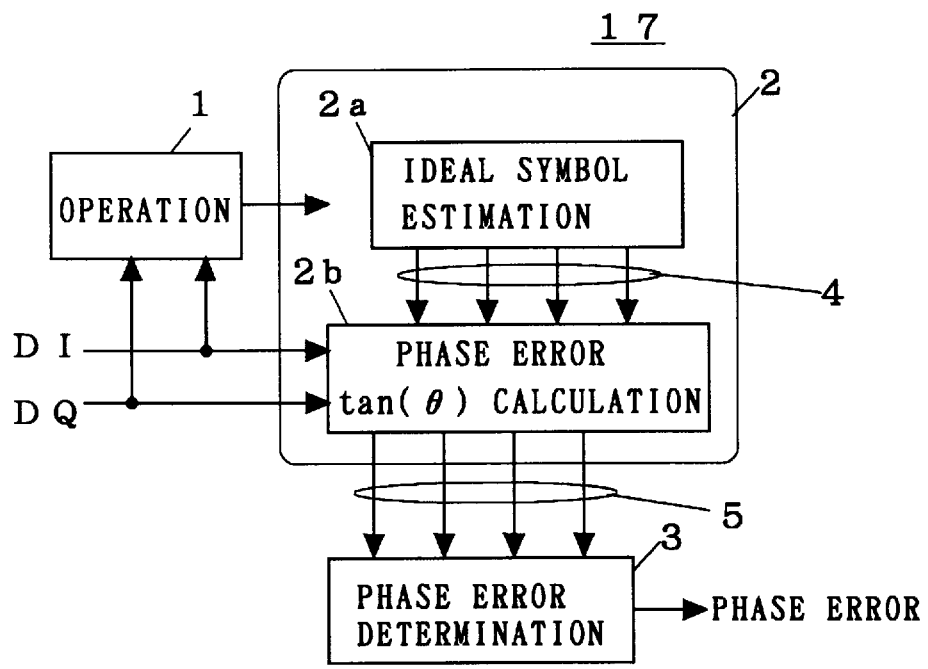
FIG. 1 is a block diagram showing the structure of a phase detector according to a first preferred embodiment.

A phase detector according to a first preferred embodiment of the present invention will now be described referring to FIG. 1. FIG. 1 is a block diagram showing the structure of a phase detector according to a first preferred embodiment. An example of 256 QAM will be described referring to FIG. 1.

Figure 36:
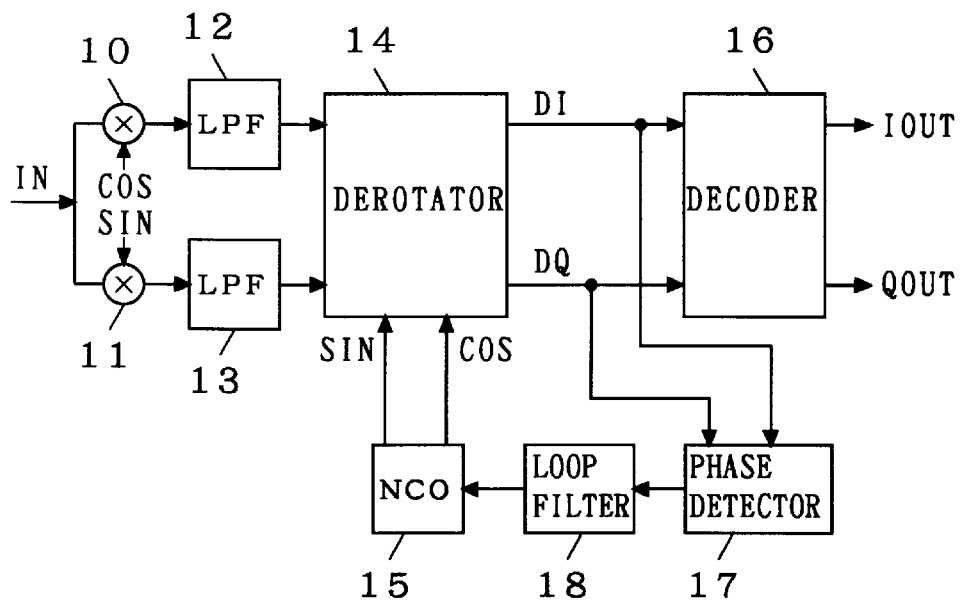
FIG. 36 is a block diagram showing the structure of a QAM demodulator.
Figure 37:
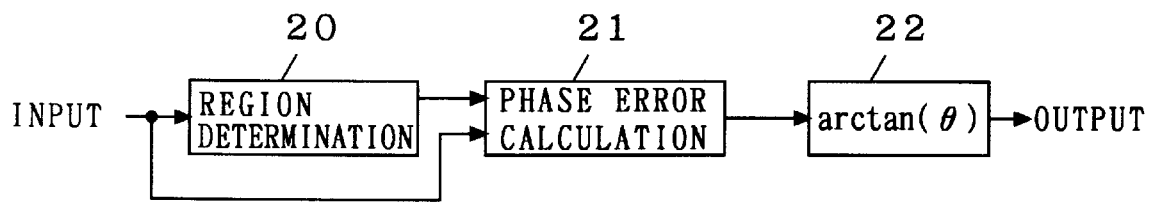
FIG. 37 is a block diagram showing the structure of a conventional phase detector.
Figure 38:
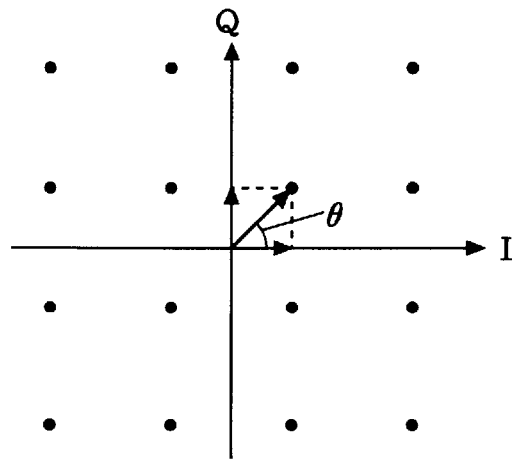
FIG. 38 is a graph showing vector arrangement of 16 QAM in which in-phase and vertical signals and provided with four values.
Figure 39:
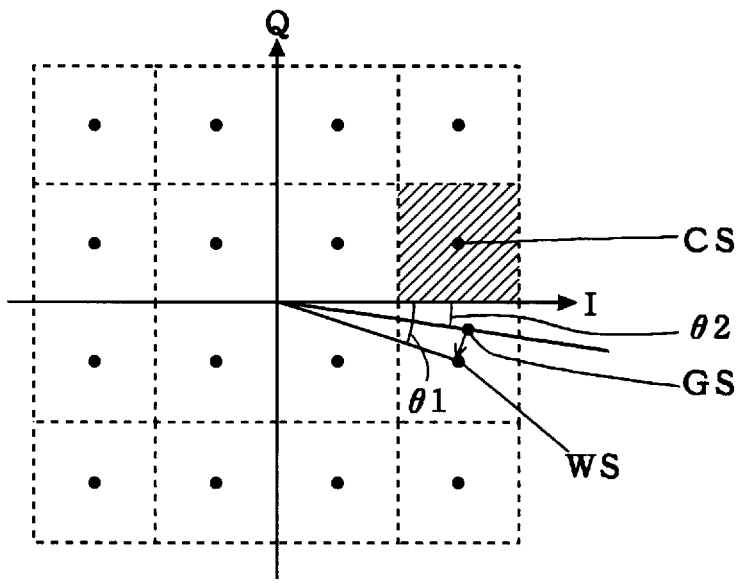
FIG. 39 is a graph showing the relation between the phase error determination and threshold values in 16 QAM.
Figure 40:
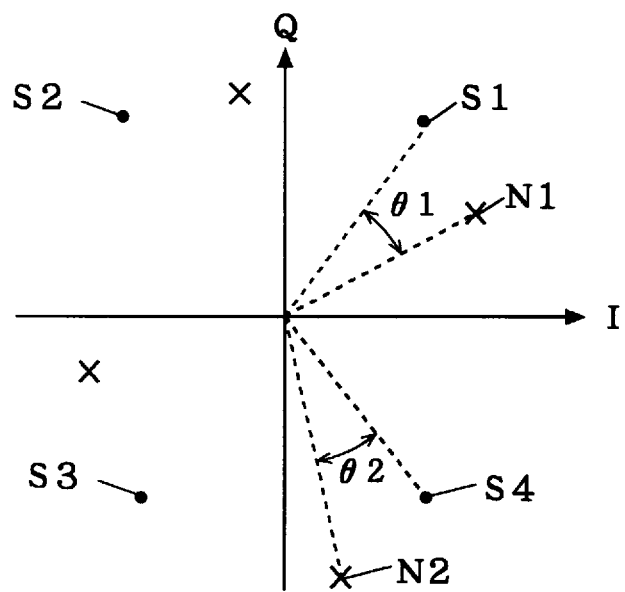
FIG. 40 is a graph for describing phase errors.
Figure 43:
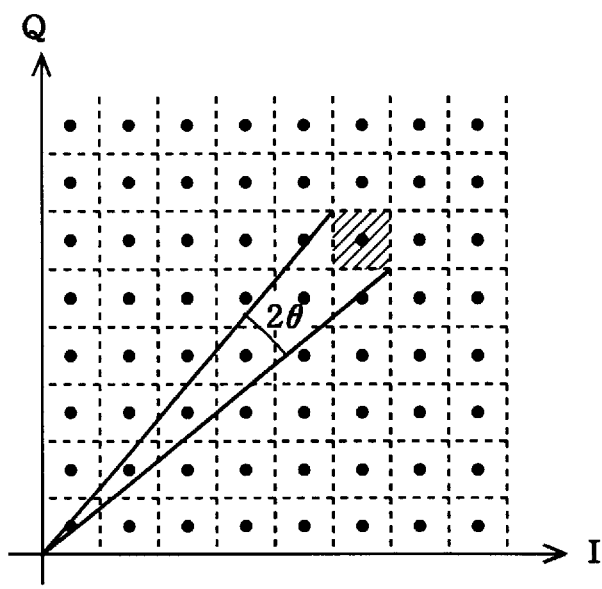
FIG. 43 is a graph for describing the threshold regions in the case of 256 QAM.
Figure 44:
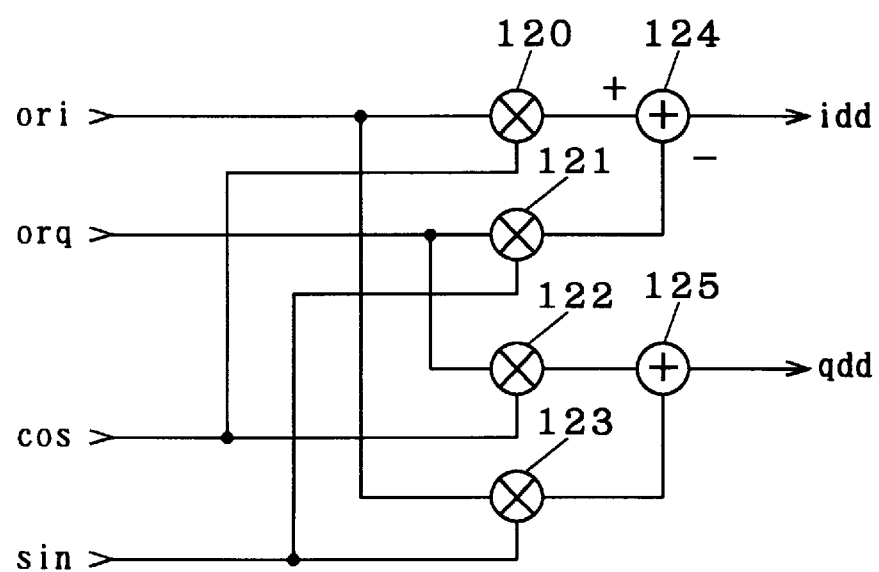
FIG. 44 is a block diagram showing the structure of the derotator.

This phase detector corresponds to the phase detector 17 in FIG. 36. Data DI and DQ provided to the phase detector of FIG. 1 are outputs of the derotator 14 of FIG. 36, which represent the coordinates (i, q) of an actually-received symbol.

An operating block 1 obtains, from the data DI and DQ provided, the power of carriers or the amplitude of carriers of the data. A phase error calculating block 2 is a block for calculating phase errors from the power or amplitude of carriers outputted from the operating block 1. The phase error calculating block 2 includes an ideal symbol estimating block 2a for estimating to which ideal symbol an actually-received symbol has corresponded when transmitted and a phase error tan($\theta$) calculating block 2b for obtaining tan($\theta$) as a plurality of prediction phase errors from the plurality of ideal symbols estimated in the ideal symbol estimating block 2a and the actually-received symbol. The ideal symbol estimating block 2a estimates ideal symbols corresponding to an actually-transmitted symbol from the power or amplitude obtained in the operating block 1. The actually-transmitted symbol is a symbol which has been actually transmitted, which is almost the same as one of the ideal symbols because it is not affected when transmitted. That is to say, ideal symbols which may have the same power or amplitude are randomly extracted. The ideal symbol estimating block 2a outputs a plurality of symbol signals 4 showing the plurality of ideal symbols extracted. The phase error tan($\theta$) calculating block 2b calculates a plurality of tan($\theta$), which are determined by prediction phase errors $\theta$ with respect to the actually-received symbol provided by the data DI and DQ, from the plurality of symbol signals 4 individually specifying ideal symbols and outputs the values as prediction phase error signals 5. A phase error determining circuit 3 determines the most suitable phase error from among the plurality of prediction phase error signals 5 outputted from the phase error tan($\theta$) calculating block 2b.

Producing the prediction phase error signals 5 on the basis of the power or amplitude of carriers makes it possible to obtain prediction phase errors $\theta$ even with input signals having such large frequency errors or phase errors that $-\pi/4 < \theta < \pi/4$, for example.

Furthermore, since an ideal symbol is not extracted on the basis of a distance between an actually-received symbol and the adjacent ideal symbols, the range of detection of the phase error is not narrowed with an increase of the number of ideal symbols.

Figure 2:
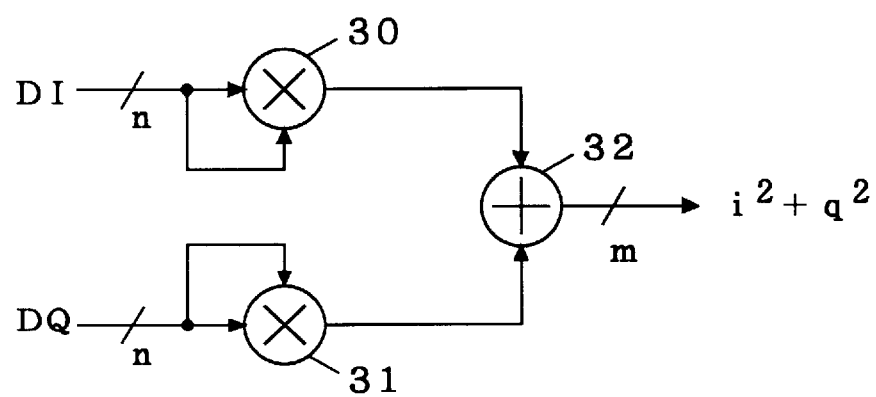
FIG. 2 is a block diagram showing an example of structure of the operating circuit for calculating the power of carriers.

Next, the structure of the operating block 1 will be described. FIG. 2 is a block diagram showing the structure of an operating circuit for calculating the power of carriers, $(i^2+q^2)$. In the operating circuit shown in FIG. 2, the multiplier 30 multiplies a value given by n-bit data DI by itself to obtain the square of the value given by the data DI. The multiplier 31 multiplies a value given by the n-bit data DQ by itself to obtain the square of the value given by the data DQ. Then the adder 32 adds the outputs of the multipliers 30 and 31 to output $i^2+q^2$.

Figure 3:
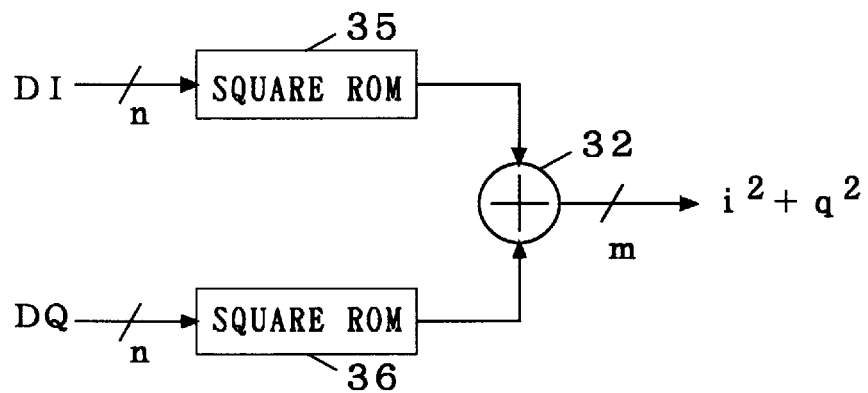
FIG. 3 is a block diagram showing another example of structure of the operating circuit for calculating the power of carriers.

The multipliers 30 and 31 used here calculate squares. Accordingly, as shown in FIG. 3, a storage device storing squares $i^2$ of values given by input data DI at addresses given by the data DI may be used and a storage device storing squares $q^2$ of values given by data DQ at addresses given by the data DQ may be used. Here, ROMs 35 and 36 which use input values as addresses and have the output values stored in memory cells are used in place of the multipliers 30 and 31.

Figure 4:
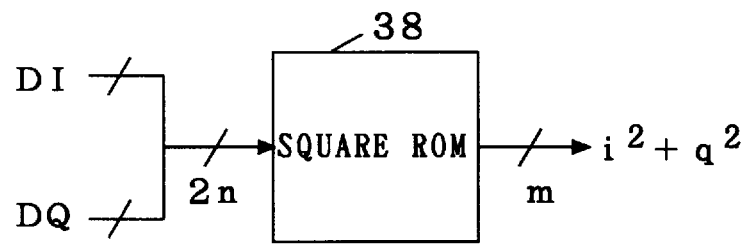
FIG. 4 is a block diagram showing another example of structure of the operating circuit for calculating the power of carriers.

As shown in FIG. 4, a ROM 38 which uses data DI and DQ showing coordinates (i, q) of symbols as addresses and directly contains $i^2+q^2$ stored in memory cells at those addresses may be used to obtain the power of carriers without using the multipliers 30 and 31 and the adder 32.

Figure 5:
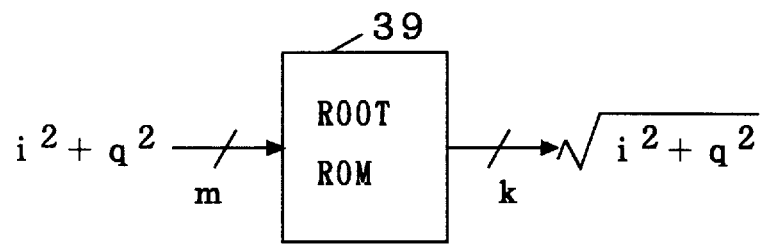
FIG. 5 is a block diagram showing another example of structure of the operating circuit for calculating the amplitude of carriers.

It is also possible to use a root ROM 39 shown in FIG. 5 to obtain, instead of the power $(i^2+q^2)$ of carriers, the amplitude of carriers, or the root of $(i^2+q^2)$, from the power $(i^2+q^2)$, to perform operation of estimating ideal symbols by using the amplitude of carriers in place of the power of carriers.

Thus constructing the circuit using storage devices makes it possible to obtain the power or magnitude of amplitude of input signal without using multipliers of large circuit scale, enabling reduction of the circuit scale.

Figure 6:
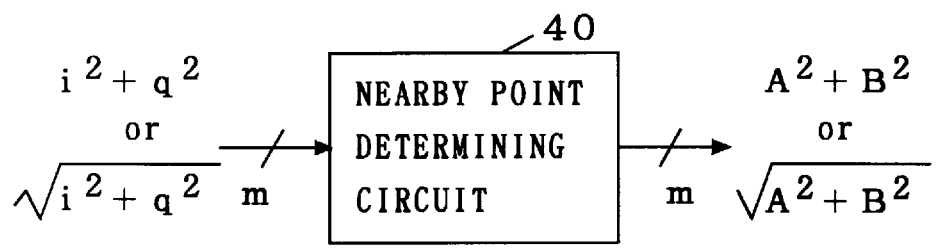
FIG. 6 is a block diagram for explaining the operation of a nearby point determining circuit.

The power or amplitude of carriers given by inputted data DI and DQ does not always coincide with the power or amplitude of carriers of an actually-transmitted symbol. In this case, it is necessary to approximate the power of carriers given by data DI and DQ to the power or amplitude of carriers providing a nearby ideal symbol. In this case, a nearby point determining circuit is inserted, preceding the ideal symbol estimating block 2a of the phase error calculating block 2. This nearby point determining circuit will now be described referring to FIG. 6 and FIG. 7. When the power $(i^2+q^2)$ or the amplitude given by the root of $(i^2+q^2)$ does not coincide with the power $(A^2+B^2)$ or the root of $(A^2+B^2)$ of an ideal symbol (A, B), the nearby point determining circuit 40 for determining power or amplitude of a nearby ideal symbol (A, B) as shown in FIG. 6 is inserted to precede the ideal symbol estimating block 2a of FIG. 1, so that an ideal symbol (A, B) can always be estimated. This eliminates undeterminable regions and enables efficient determination.

In order to determine what extent of power $(i^2+q^2)$ or amplitude of inputted carriers approximates power or amplitude of carriers of which ideal symbol, boundaries are previously determined corresponding to values of powers or amplitudes of carriers of ideal symbols.

Figure 7:
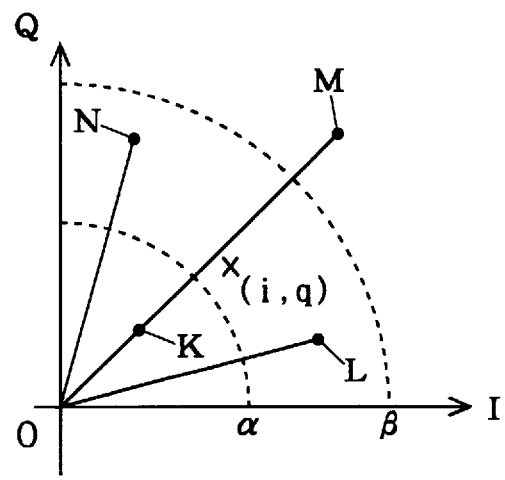
FIG. 7 is a graph for describing the operation of the nearby point determining circuit in the case of 16 QAM.

As shown in FIG. 7, for example, in the case of 16 QAM, when the four ideal symbols in the first quadrant are taken as K, L, M, and N, then the power or amplitude of carriers of the ideal symbols take three different values of power or amplitude: the power or amplitude of the symbol K, the power or amplitude of the symbols L, N, and the power or amplitude of the symbol M. Accordingly, the two boundaries $\alpha$ and $\beta$ provide regions of ideal symbols for approximation. For example, the boundary $\alpha$ is set on the circle around the origin at the middle of the powers or amplitudes of the symbol K and the symbols L, N, and the boundary $\beta$ is set on the circle around the origin at the middle of the powers or amplitudes of the symbols L, N and the symbol M.

Figure 8:
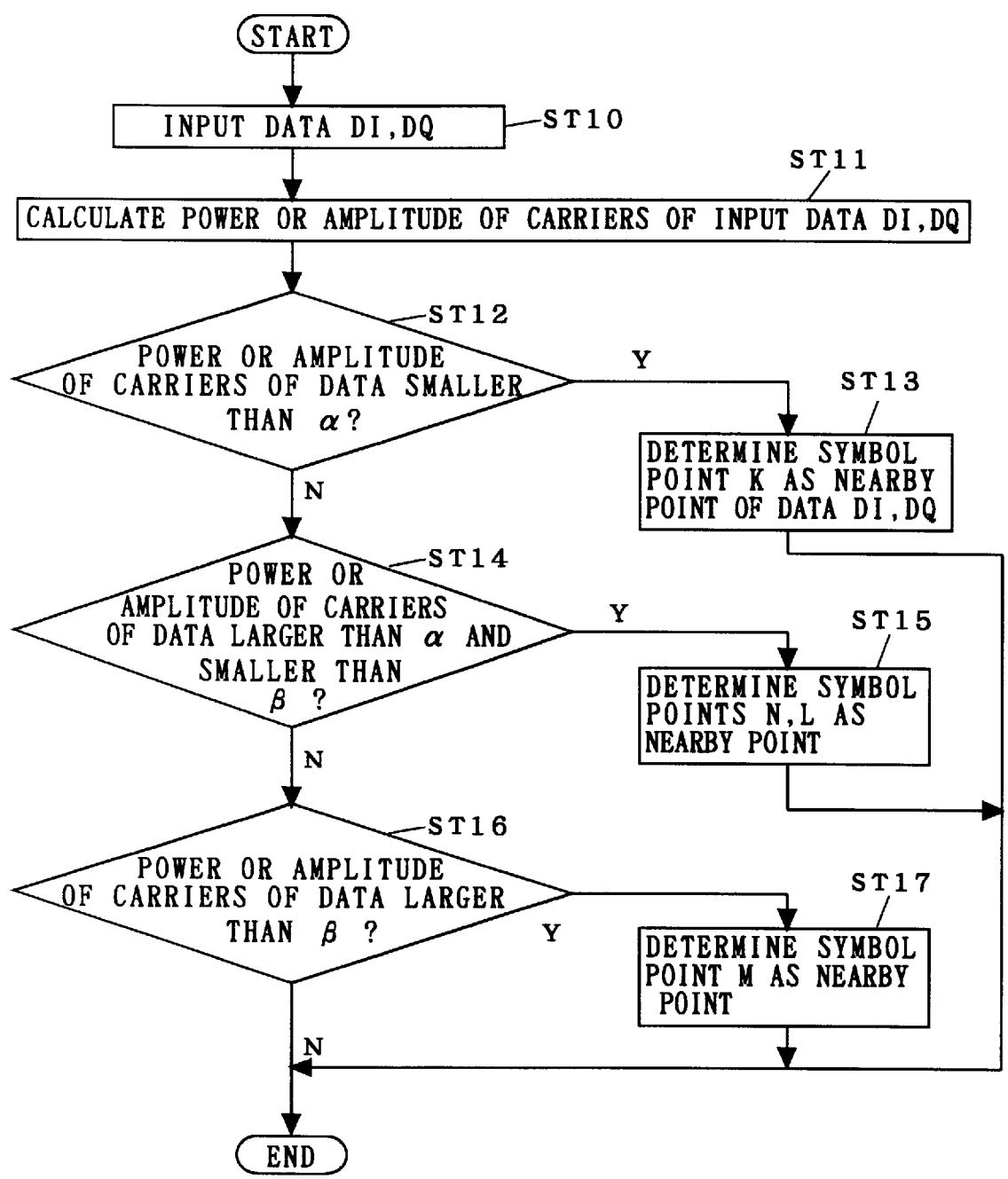
FIG. 8 is a flow chart showing the procedure for determining a nearby point.

Under such settings, a nearby point for an actually-received symbol given by data DI and DQ is determined by such procedure as shown in FIG. 8. Data DI and DQ are inputted (Step ST10) and then the power or amplitude of carriers of the inputted actually-received symbol is calculated. (Step ST11) It is determined whether the power or amplitude of carriers of the actually-received symbol calculated in Step ST11 is smaller than α. (Step ST12) If the power or amplitude is smaller than α, it moves to Step ST13, where the symbol K is determined as a nearby point of the actually-received symbol and this process ends.

If the result of the determination in Step ST12 is negative, a determination is made in Step ST14. If the power or amplitude of the actually-received symbol is larger than α and smaller than β, it moves to Step ST15, where the symbols N, L are determined as nearby points of the actually-received symbol and the process ends.

If the result of the determination in Step ST14 is negative, a determination is made in Step ST16. If the power or amplitude of the actually-received symbol is larger than β, it moves to Step ST17, where the symbol M is determined as a nearby point of the actually-received symbol and this process ends.

If the power or amplitude of carriers of the actually-received symbol given by data DI and DQ coincides with that of an ideal symbol, the process shown in FIG. 8 is not performed.

Figure 9:
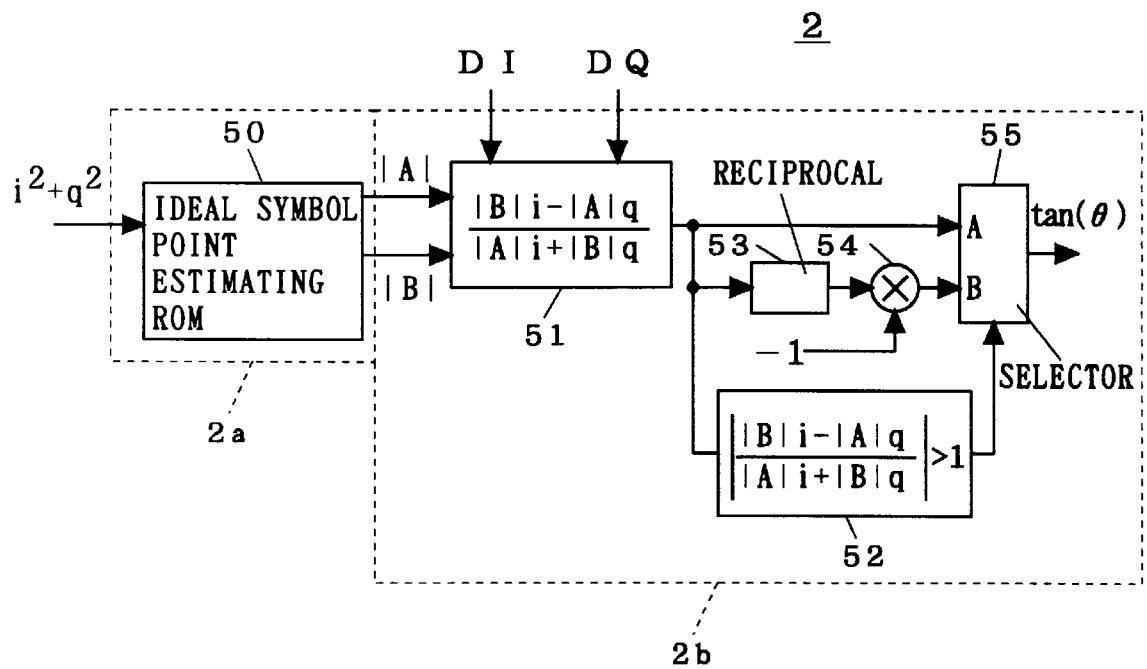
FIG. 9 is a block diagram showing an example of structure of the phase error tan(θ) calculating block.

Next, the phase error calculating block 2 will be described. FIG. 9 is a block diagram showing an example of structure of the phase error calculating block 2. In FIG. 9, 50 denotes an ideal symbol estimating ROM for outputting coordinates of ideal symbols using the power or amplitude of carriers of an actually-received symbol, 51 denotes a $\tan(\theta)$ calculating portion for calculating phase errors between the plurality of ideal symbols outputted from the ideal symbol estimating ROM 50 and the actually-received symbol, 52 denotes a comparator portion for determining whether the absolute values of the plurality of values of $\tan(\theta)$ outputted from the $\tan(\theta)$ calculating portion 51 are larger or smaller than 1, 53 denotes a reciprocal generating portion for generating the reciprocals of the outputs of the $\tan(\theta)$ calculating portion 51, 54 denotes a multiplier for multiplying the outputs of the reciprocal generating portion 53 by −1, and 55 denotes a selector for selectively outputting one of the outputs of the multiplier 54 and the $\tan(\theta)$ calculating portion 51 according to an output of the comparator portion 52.

The ideal symbol estimating block 2a is composed of the ideal symbol estimating ROM 50. The phase error $\tan(\theta)$ calculating block 2b is composed of the $\tan(\theta)$ calculating portion 51, the comparator portion 52, the reciprocal generating portion 53, the multiplier 54 and the selector 55.

The power $(i^2+q^2)$ of an actually-received symbol is inputted to the ideal symbol estimating ROM 50. The ideal symbol estimating ROM 50 outputs the absolute values of ideal symbols (A, B) using the power $(i^2+q^2)$ as address. The phase errors $\tan(\theta)$ are calculated by using the absolute values of the ideal symbols (A, B). Subsequently, an absolute value is obtained for each. If $\tan(\theta)>1$, then the reciprocal of the $\tan(\theta)$ is obtained, multiplied by −1, and outputted.

Figure 10:
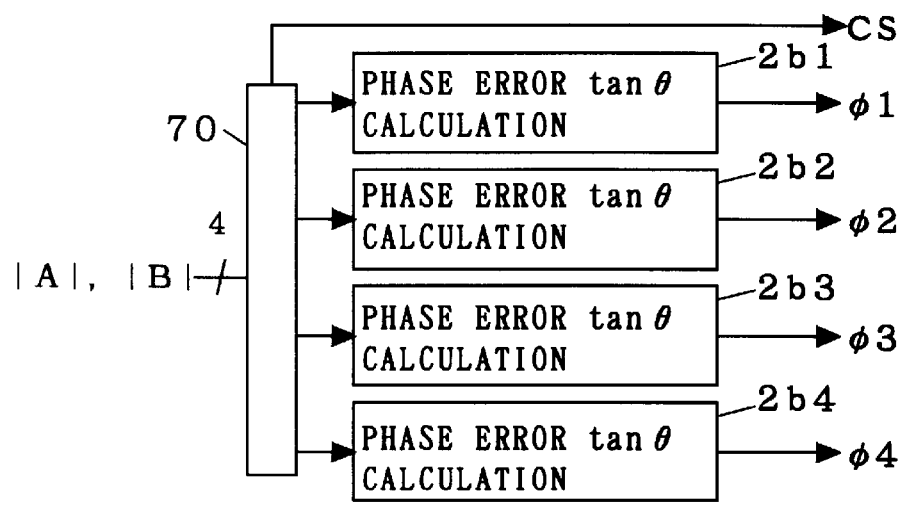
FIG. 10 is a block diagram showing an example of arrangement of the phase error tan(θ) calculating blocks.

As shown in FIG. 10, all possible phase errors $\tan(\theta)$ are calculated in parallel. For example, the phase error $\tan(\theta)$ calculating blocks 2b1 to 2b4 are supplied with different (|A|, |B|) from the ideal symbol estimating ROM 2a and perform calculations with the (|A|, |B|) provided. There may be only one or two kinds of (|A|, |B|), however, in which case the kinds of (|A|, |B|) are detected in the detecting portion 70 and a signal CS indicative of the kinds is outputted from the phase error $\tan(\theta)$ calculating block, for example.

Next, the calculation of $\tan(\theta)$ in the phase error $\tan(\theta)$ calculating block 2b shown in FIG. 9 will be explained.

Ideal symbols with equal $(i^2+q^2)$ are distributed on the circle with the radius equal to the root of $(i^2+q^2)$ around the origin on the coordinates.

Figure 13:
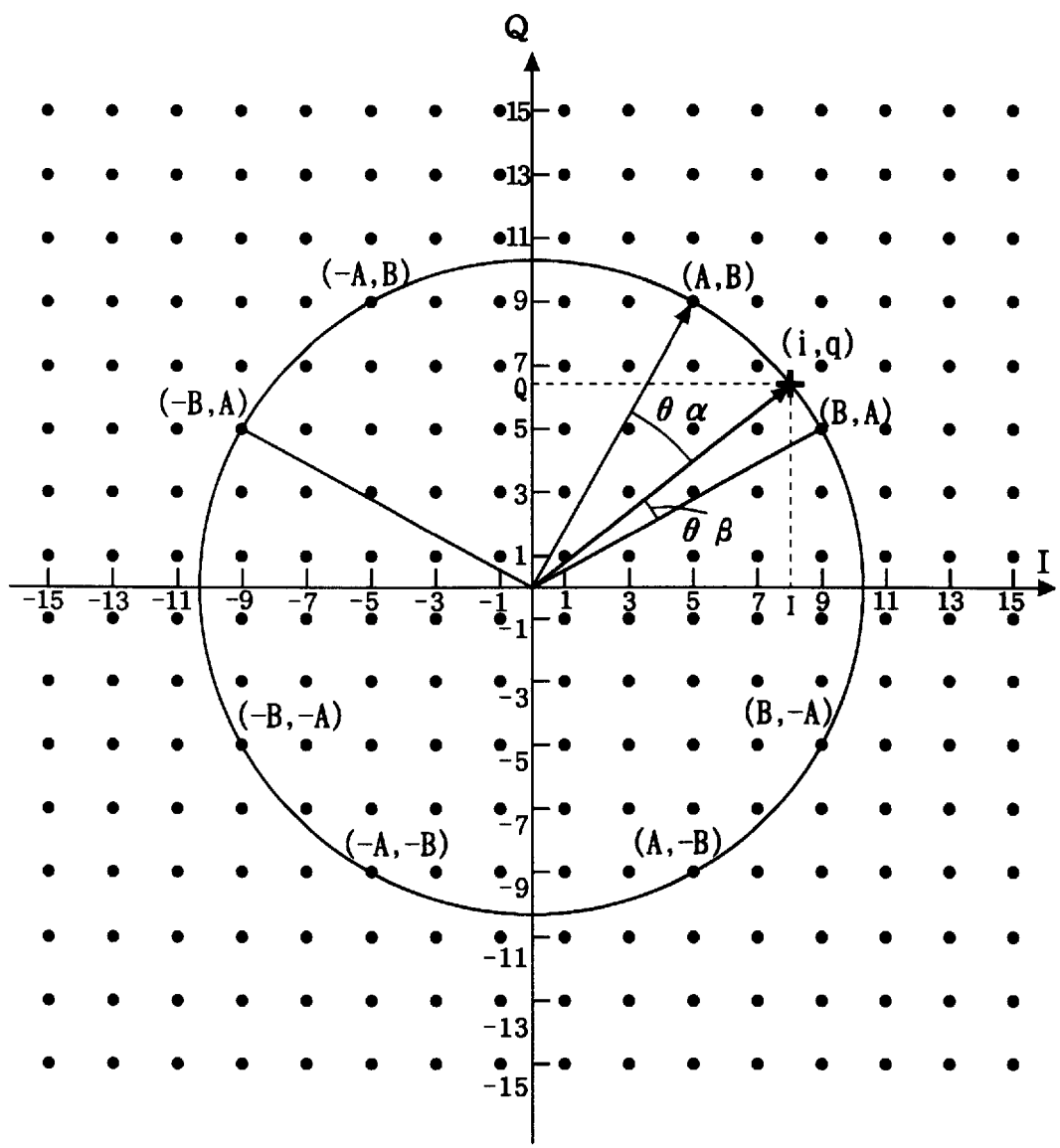
FIG. 13 is a diagram showing arrangement of symbols in 256 QAM.

FIG. 13 is a diagram showing arrangement of symbols in the case of 256 QAM. FIG. 13 shows the locus of the root of $(i^2+q^2)$.

As shown in FIG. 13, eight symbols exist on this circumference in many cases. That is to say, when using the power $(i^2+q^2)$ or the root of $(i^2+q^2)$, eight points of ideal symbols (A, B) are estimated as those which might have been transmitted for the actually-received symbol (i, q).

The eight symbols have the coordinates (A, B), (B, A), (−A, B), (−B, A), (A, −B), (B, −A), (−A, −B), (−B, −A).

In actual circuit design, this determining circuit is included in data in the ideal symbol estimating ROM 2a shown in FIG. 9. According to equation 1, phase errors $\tan(\theta)$ are obtained between the ideal symbols and the actually-received symbol.

With (A, B)  $\tan(\theta) = \tan(\theta\alpha)$

With (B, A)  $\tan(\theta) = \tan(\theta\beta)$

With (−A, B)  $\tan(\theta) = \dfrac{-1}{\tan(\theta\beta)}$

With (A, −B)  $\tan(\theta) = \dfrac{-1}{\tan(\theta\alpha)}$

With (B, −A)  $\tan(\theta) = \dfrac{-1}{\tan(\theta\alpha)}$

With (−A, −B)  $\tan(\theta) = \tan(\theta\alpha)$

With (−B, −A)  $\tan(\theta) = \tan(\theta\beta)$

That is to say, it is seen that the phase error $\tan(\theta)$ takes only four values: $\tan(\theta\alpha)$, $\tan(\theta\beta)$, $-1/\tan(\theta\alpha)$, and $-1/\tan(\theta\beta)$.

Now, if it is limited so that $-1 \leq \tan(\theta) < 1$, that is, if $-\pi/4 \leq \theta < \pi/4$ on the basis of the actually-received symbol X, one of the $\tan(\theta\alpha)$ and $-1/\tan(\theta\alpha)$ and one of the $\tan(\theta\beta)$ and $-1/\tan(\theta\beta)$ are out of the range and the phase error can be specified to two values.

Figure 14:
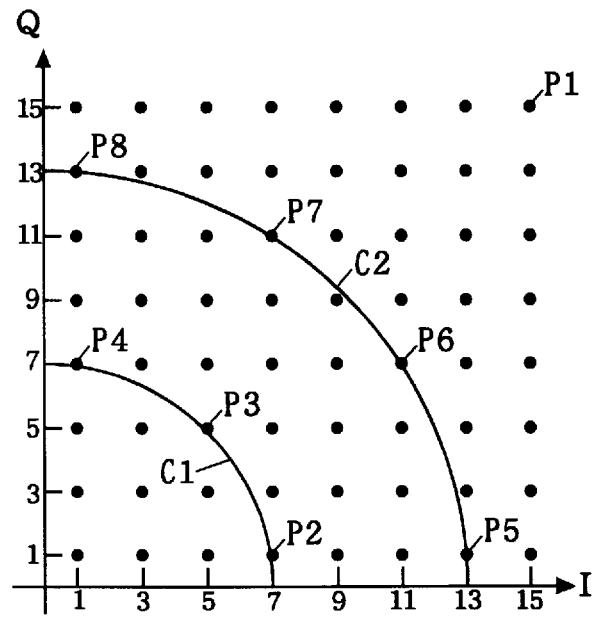
FIG. 14 is a diagram showing the arrangement of symbols only in the first quadrant in 256 QAM.

An example which does not fall under the above-described example will be explained referring to FIG. 14. FIG. 14 shows only the first quadrant in the 256 QAM symbol arrangement diagram to simplify the description.

When the coordinates of an actually-received symbol X is at the same distance from the origin as the coordinates (A, B) of ideal symbols and the condition of A=B or A=−B is satisfied, four symbols may be estimated. At this time, $\tan(\theta\alpha)=\tan(\theta\beta)$ and the phase error $\tan(\theta)$ is uniquely determined. The point P1 corresponds to this in FIG. 14.

Next, in 64 QAM, 256 QAM, if the actually-received symbol X has coordinates (i, q) and $i^2+q^2=50$, 12 ideal symbols, the coordinates (|A|, |B|)=(1, 7), (7, 1), (5, 5) are estimated by the ideal symbol estimating ROM 50.

From the coordinates (|A|, |B|)=(1, 7) and (7, 1), four values, $\tan(\theta\alpha)$, $\tan(\theta\beta)$, $-1/\tan(\theta\alpha)$, $-1/\tan(\theta\beta)$, are obtained as the phase error $\tan(\theta)$, similarly to the above-described common case. If it is limited so that $-1 \leq \tan(\theta) < 1$, i.e., $-\pi/4 \leq \theta < \pi/4$ on the basis of the coordinates of the actually-received symbol X, one of the $\tan(\theta\alpha)$ and $-1/\tan(\theta\alpha)$ and one of the $\tan(\theta\beta)$ and $-1/\tan(\theta\beta)$ are out of the range and the prediction phase error can be specified to two values.

With the symbols providing the coordinates (|A|, |B|)=(5, 5), the error with respect to the actually-received symbol X is tan(θα)=tan(θβ) and the phase error tan(θ) is uniquely determined. That is to say, the phase error tan(θ) can be specified as three values. The points P2 to P4 existing on the concentric circle C1 in FIG. 14 correspond to this.

Next, in 256 QAM, if an actually-received symbol has the coordinates (i, q) and $i^2+q^2=170$, the ideal symbol estimating ROM 50 estimates 16 ideal symbols having the coordinates (|A|, |B|)=(1, 13), (13, 1), (7, 11), (11, 7).

For the phase errors tan(θ) of the symbols satisfying the condition of the coordinates (|A|, |B|)=(1, 13), (13, 1), the four values are obtained: tan(θα), tan(θβ), −1/tan(θα), and −1/tan(θβ).

Now, if the range for obtaining the phase errors is limited to $-1 \leq \tan(\theta) < 1$, that is, $-\pi/4 \leq \theta < \pi/4$ on the basis of the coordinates of the actually-received symbol X, one of the tan(θα) and −1/tan(θα) and one of the tan(θβ) and −1/tan(θβ) are out of the range and the prediction phase errors can be specified to two values.

Similarly, two prediction phase errors are obtained from the coordinates (|A|, |B|)=(7, 11), (11, 7). Accordingly, prediction phase errors can be specified to the four values in total in this case. In FIG. 14, the points P5 to P8 existing on the concentric circle C2 correspond to this.

That is to say, the phase error tan(θ) calculating block 2b outputs four kinds of candidates for the phase error tan(θ) at the most.

Figure 15:
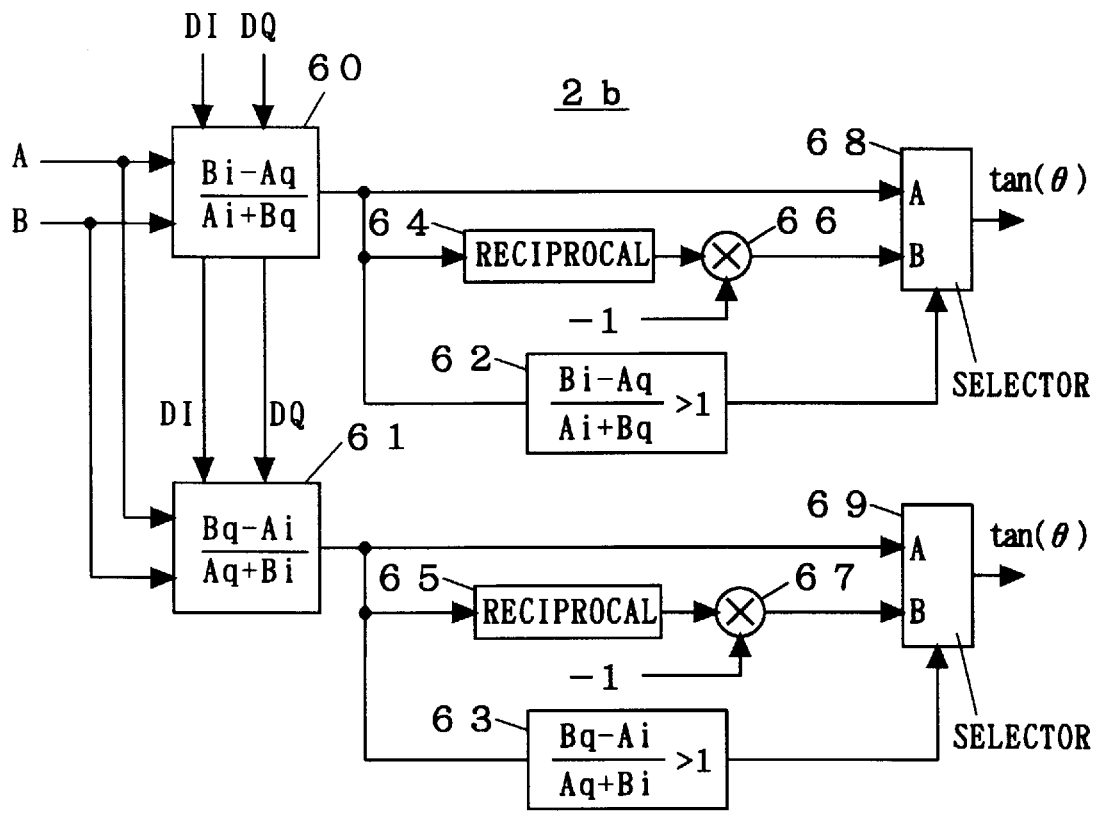
FIG. 15 is a block diagram showing another example of structure of the phase error tan(θ) calculating block.

Instead of the phase error tan(θ) calculating block shown in FIG. 9, it is also possible, as shown in FIG. 15, to calculate tan(θ)=(Bi−Aq)/(Ai+Bq) and tan(θ)=(Bq−Ai)/(Aq+Bi) without using absolute values of the ideal symbol (A, B), where if a result of the calculation shows tan(θ)>1, the reciprocal is obtained, multiplied by −1, and outputted.

In FIG. 15, 60 and 61 denote tan(θ) calculating portions for calculating phase errors between a plurality of ideal symbols outputted from the ideal symbol estimating ROM 50 and a transmitted symbol, 62 and 63 denote comparator portions for determining whether the absolute values of the plurality of values of tan(θ) outputted from the tan(θ) calculating portions 60 and 61 are larger or smaller than 1, 64 and 65 denote reciprocal generating portions for generating reciprocals of outputs of the tan(θ) calculating portions 60 and 61, 66 and 67 denote multipliers for multiplying outputs of the reciprocal generating portions 64 and 65 by −1, and 68 and 69 denote selectors for selectively outputting one of the outputs of the multipliers 66 and 67 and the tan(θ) calculating portions 60 and 61 according to the outputs of the comparators 62 and 63.

The tan(θ) calculating portion 60 calculates (Bi−Aq)/(Ai+Bq). The tan(θ) calculating portion 61 calculates (Bq−Ai)/(Aq+Bi).

Figure 16:
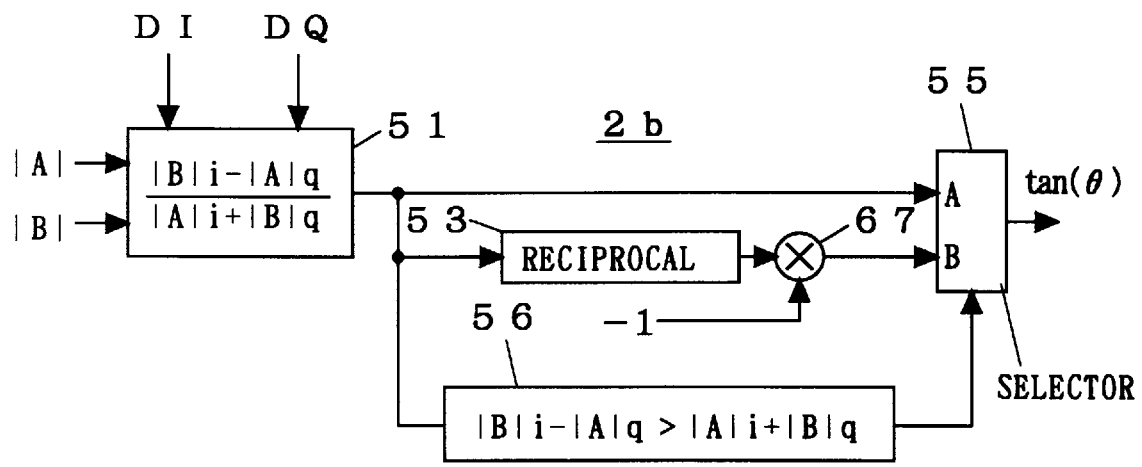
FIG. 16 is a block diagram showing another example of the structure of the phase error tan(θ) calculating block.

Instead of using the phase error tan(θ) calculating block shown in FIG. 9, it is also possible, as shown in FIG. 16, to separately calculate the term of the numerator and the term of the denominator in equation 1. When calculation results for the numerator and the denominator are taken as NU and DE, respectively, the comparator portion 56 of FIG. 16 may be constructed to compare the two results, and if NU<DE, NU/DE is calculated, and if NU>DE, −(DE/NU) is calculated and the result is outputted. In FIG. 16, the parts shown at the same characters as those in FIG. 9 correspond to those at the same characters in FIG. 9.

Furthermore, instead of calculating all of possible phase errors tan(θ) in parallel using a structure like that shown in FIG. 10, the plurality of operations can be multiplexed with a doubled or quadrupled clock rate for the phase error tan(θ) calculating block so that the circuit scale of the phase error tan(θ) calculating block can be reduced.

Figure 11:
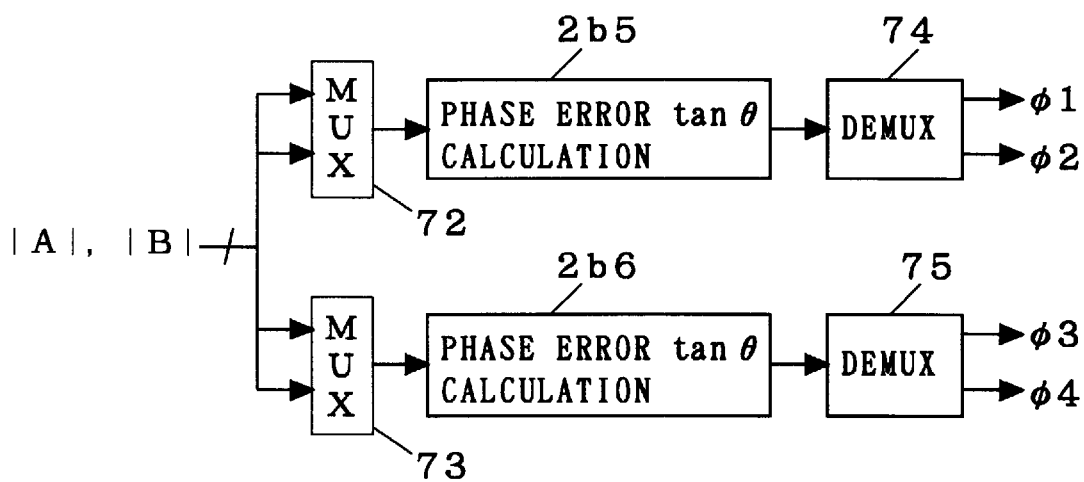
FIG. 11 is a block diagram showing another example of the arrangement of the phase error tan(θ) calculating blocks.
Figure 12:
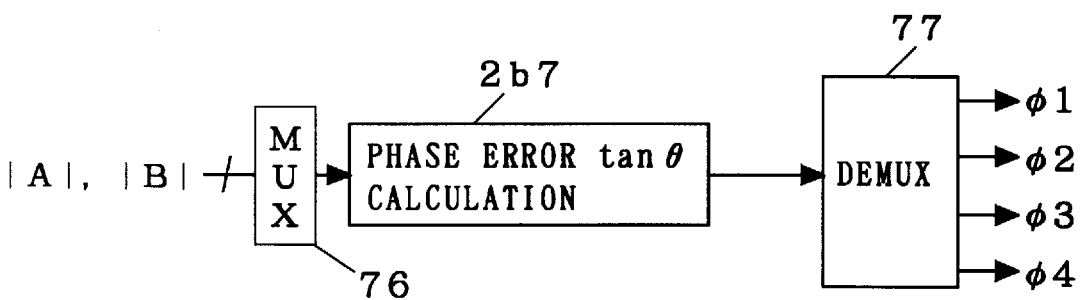
FIG. 12 is a block diagram showing another example of the arrangement of the phase error tan(θ) calculating block.

FIG. 11 shows the case in which the clock rate is doubled and FIG. 12 shows the case in which the clock rate is quadrupled. In FIG. 11, 72 and 73 denote multiplexers for multiplexing two of the four values of (|A|, |B|) outputted from the ideal symbol estimating ROM 50, 2b5 and 2b6 denote phase error tan(θ) calculating blocks for calculating prediction phase errors from the values of (|A|, |B|) sequentially outputted from the multiplexers 72 and 73, and 74 and 75 denote demultiplexers for separating the signals indicative of prediction phase errors outputted from the phase error tan(θ) calculating blocks 2b5 and 2b6.

In FIG. 12, 76 denotes a multiplexer for multiplexing the four values of (|A|, |B|) outputted from the ideal symbol estimating ROM 50, 2b7 denotes a phase error tan(θ) calculating block for calculating phase errors from the (|A|, |B|) outputted from the multiplexer 76, and 77 denotes a demultiplexer for separating the signals indicating phase errors sequentially outputted from the phase error tan(θ) calculating block 2b7. The circuits of FIG. 11 and FIG. 12 are provided in the stage following the detecting portion 70 in FIG. 10. This reduces the circuit scale to ½ and ¼.

Figure 17:
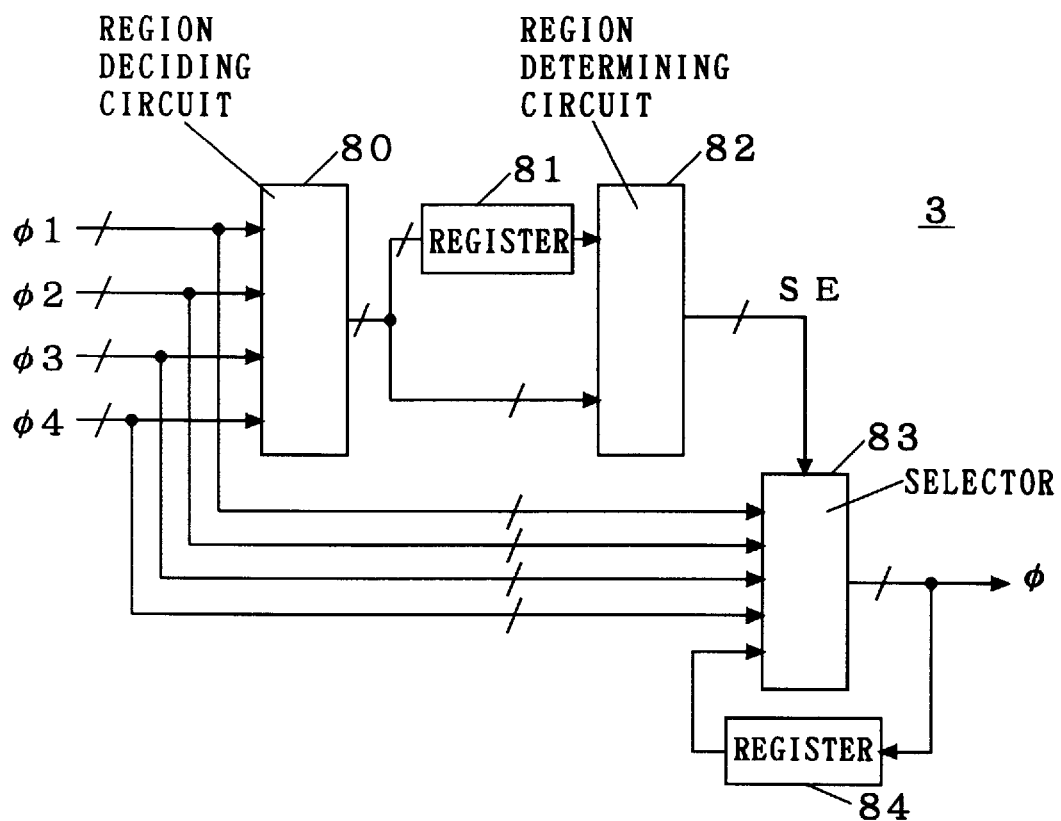
FIG. 17 is a block diagram showing an example of structure of the phase error determining circuit.

FIG. 17 is a block diagram showing an example of the structure of the phase error determining circuit 3. In FIG. 17, 80 denotes a region deciding circuit for deciding to which of a plurality of regions divided between tan(−π/4) and tan(π/4) the tangents φ1 to φ4 of the prediction phase errors belong, 81 denotes a register for holding the output of the region deciding circuit 80 for one clock, 82 denotes a region determining circuit for comparing the output of the register 81 and the output of the region deciding circuit 80 to determine to which region selected one of the tangents φ1 to φ4 of the prediction phase errors belongs, 83 denotes a selector for selecting the phase error determined by the region determining circuit 82, and 84 denotes a register for holding the phase error φ outputted one clock before from the selector 83. The registers 81 and 84 are composed of a plurality of D flip-flops here.

The at most four kinds of input tangents φ1 to φ4 of the prediction phase errors are first inputted to the region deciding circuit 80 for determining regions in which they exist.

The region deciding circuit 80 outputs values representing the regions in which the inputted prediction phase errors exist, which is composed of a decode circuit by logic or a ROM. This region deciding circuit 80 decodes the high-order four digits of the signals φ1 to φ4 indicative of prediction phase errors, or reads data from a ROM using the high-order four digits as address, to allocate them into any of 16-divided regions.

The signal indicative of region pattern outputted from the region deciding circuit 80 is inputted to the region determining circuit 82 and the signal indicative of the region pattern of one clock before held in the register 81 is also inputted thereto. The region determining circuit 82 determines which phase error is to be selected among the phase errors belonging to the regions, to which the tangents φ1 to φ4 of the prediction phase errors belong, and outputs a select signal to the selector 83.

Figure 18:
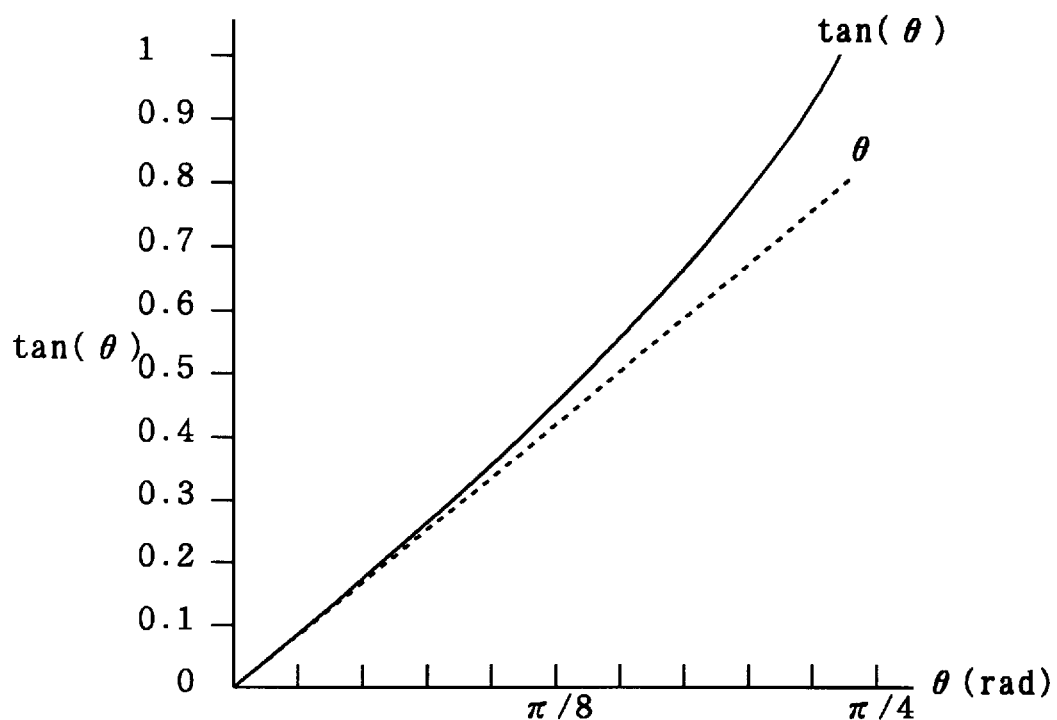
FIG. 18 is a graph showing the relation between tan(θ) and θ.

The output of the selector 83 may be used as a phase error as it is, but a ROM for obtaining θ from tan(θ) may be provided following the selector 83. The reason why the tan(θ) can be used as a phase error θ as it is, instead of θ, without obtaining θ, is as follows. The tan(θ) is approximately equal to θ near the origin. Even when θ increases to separate away from the tan(θ), the relation tan(θ)>θ always holds. Then the larger error is outputted and control is made to eliminate the error sooner. For reference, FIG. 18 shows the relation between tan(θ) and θ in a graph.

Although 256 QAM has been described herein, phase errors can be calculated by the completely same procedure with multiple values smaller than 256.

Figure 20:
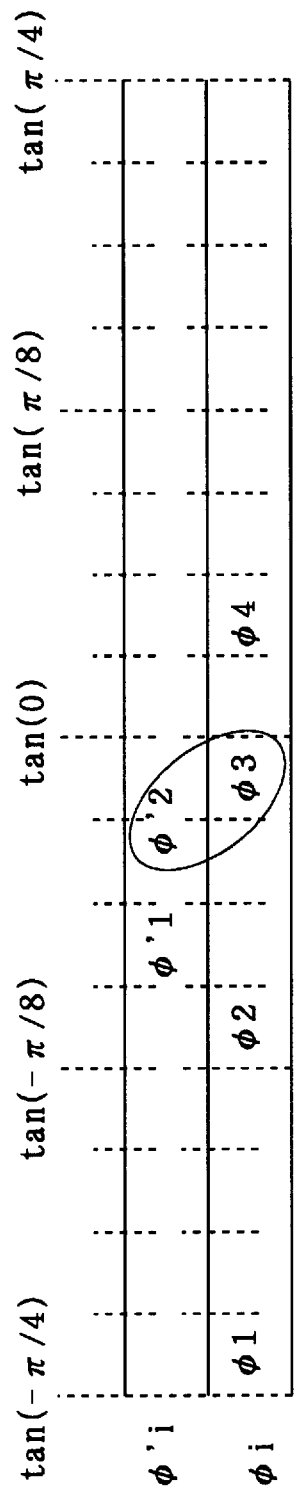
FIG. 20 is a diagram showing output results of phase errors at different times.

Next, it is necessary to determine a true phase error from the at most four kinds of predicted phase errors. As shown in FIG. 20, the true phase error can be obtained by comparing the at most four kinds of phase errors for each clock and outputting the phase error at the nearest angle at adjacent times.

Next, the procedure in the region determining circuit for detecting a phase error at the nearest angle in adjacent times will be described. The predicted at most four kinds of tan(θ) (taken as (φ1, φ2, φ3 and φ4 hereinafter) are allocated to the 16-divided existential regions. Since it is divided into 16, the high-order four bits of the values of φ1, φ2, φ3 and φ4 show the regions where they exist.

Figure 21:
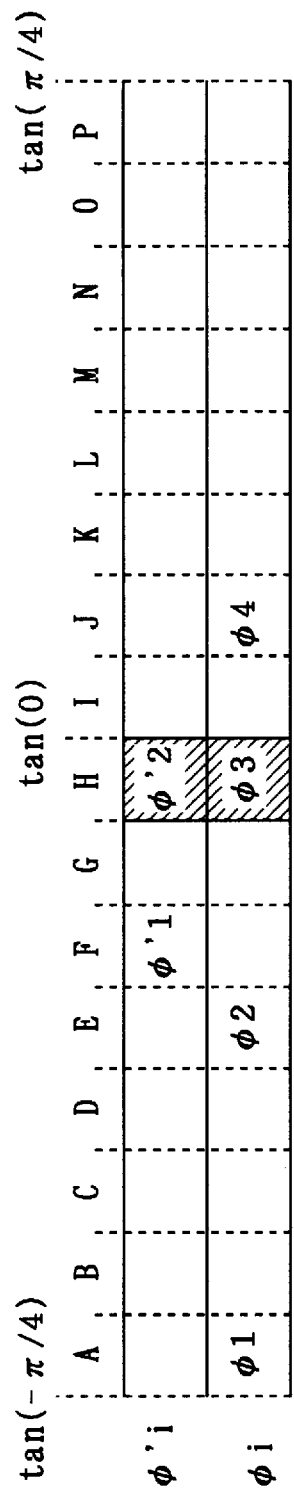
FIG. 21 is a diagram showing regions to which phase errors are allocated.

This is shown in FIG. 21. A comparison is made with the regions for φ'1 of one clock before and a value of φi in the overlapping region is considered to be a correct φ. For example, if φ3 and φ'2 overlap in the existential region H shown in FIG. 21, then the φ3 is regarded as a correct value. A φi of one clock before does not always overlap with an outputted φi in one region. The procedure for such cases in the region determining circuit will be explained referring to the flow chart of FIG. 19.

Figure 19:
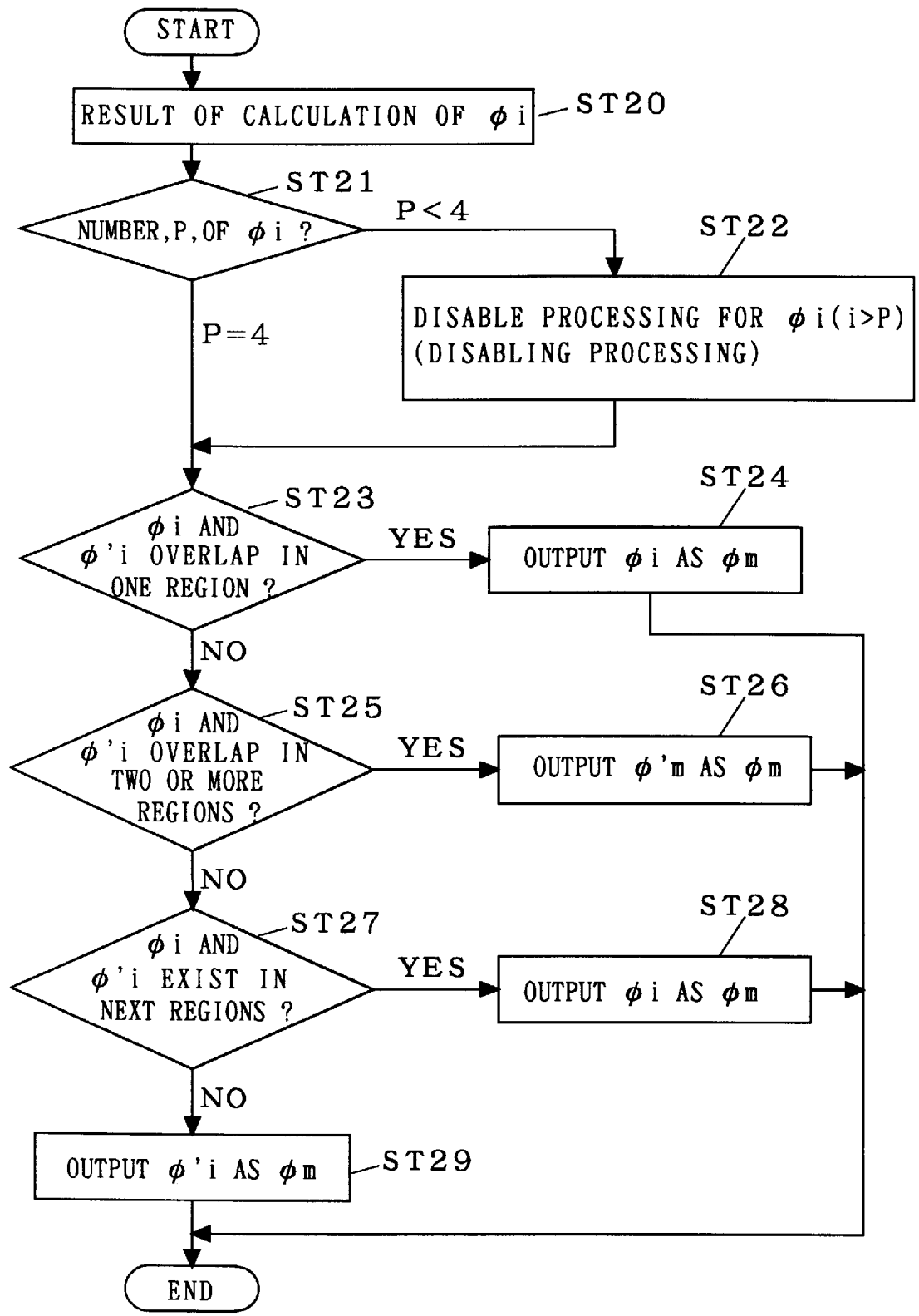
FIG. 19 is a flow chart showing the operation of the region determining circuit.

In FIG. 19, φi indicates a tangent of a prediction phase error at the present time, φ'i indicates a tangent of the prediction phase error predicted one clock before, φm indicates a tangent of a phase error estimated to be correct (a phase error for an ideal symbol estimated to be an actually-transmitted symbol), and φ'm indicates a tangent of a phase error estimated to be correct one clock before.

First, calculated results of the tangents φi for prediction phase errors are inputted. (Step ST20) Next, the number, P, of the tangents φi of the inputted prediction phase errors is determined. (Step ST21) Then, if the number P of the tangents φi of the prediction phase errors is smaller than 4, it moves to Step ST22 to perform disable processing. The disable processing means to disable processing for tangents φi (i>P) of prediction phase errors. Next, regions where a tangent φi of a current prediction phase error and a tangent φ'i of a prediction phase error of one clock before overlap are extracted and it is determined whether the number of the regions is one or not. (Step ST23) If the number of the overlap region is one, it moves to Step ST24 and such a select signal is outputted that the tangent φi of the prediction phase error is outputted as the phase error φm for the actually-transmitted symbol.

If a tangent φi of a present-time prediction phase error and a tangent φ'i of a one-clock-before prediction phase error do not overlap in one region in Step ST23, it moves to Step ST25 to determine whether a tangent φi of a current-time prediction phase error and a tangent φ'i of a one-clock-before prediction phase error overlap in two or more regions. If the determination result in Step ST25 is true, such a select signal is generated that the one-clock-before phase error φ'm is outputted as the current-time phase error φm.

If the determination result in Step ST25 is false, it means that the tangents φi of the current-time prediction phase errors and the tangents φ'i of the one-clock-before prediction phase errors do not overlap in any regions. Then it moves to Step ST27 to determine whether there is only one combination in which a tangent φi of a current-time prediction phase error and a tangent φ'i of a one-clock-before prediction phase error exist in next regions. If a result of the determination in Step ST27 is true, a select signal is generated so that the tangent φi of that prediction phase error is outputted as the phase error φm and it ends.

If the result of the determination in Step ST27 is false, a select signal is generated so that the one-clock-before phase error φ'm is outputted as the current-time phase error φm and it ends.

Figure 22:
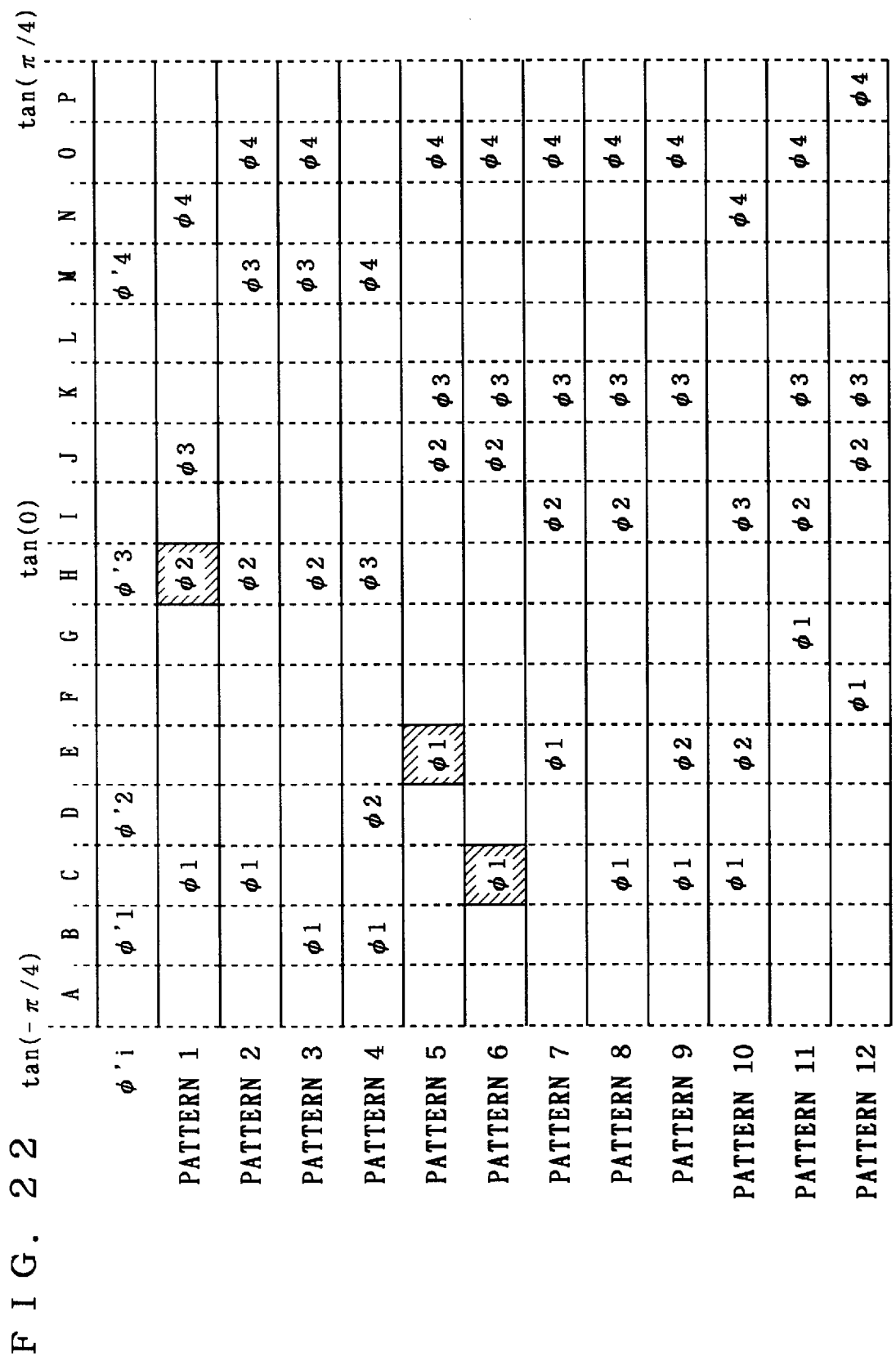
FIG. 22 is a diagram showing the phase errors allocated to the regions.

Thus a proper tan(θ) can be uniquely specified from the plurality of prediction phase errors predicted. FIG. 22 shows an example of results of determinations made while considering such conditions. The top row in FIG. 22 shows tangents of phase errors predicted one clock before the pattern 1. In FIG. 22, the shadowed regions correspond to the regions determined by the region determining circuit having the above-described function. In the patterns with no shadowed regions, the tangent φ'i of a prediction phase error of one clock before is outputted.

In an actual circuit, the existential regions are determined with high-order four bits of tangents φi of the prediction phase errors, and as shown in FIG. 23, a 1-bit signal "1" is set as a flag in the regions where tangents φi of the prediction phase errors exist.

Figure 27:
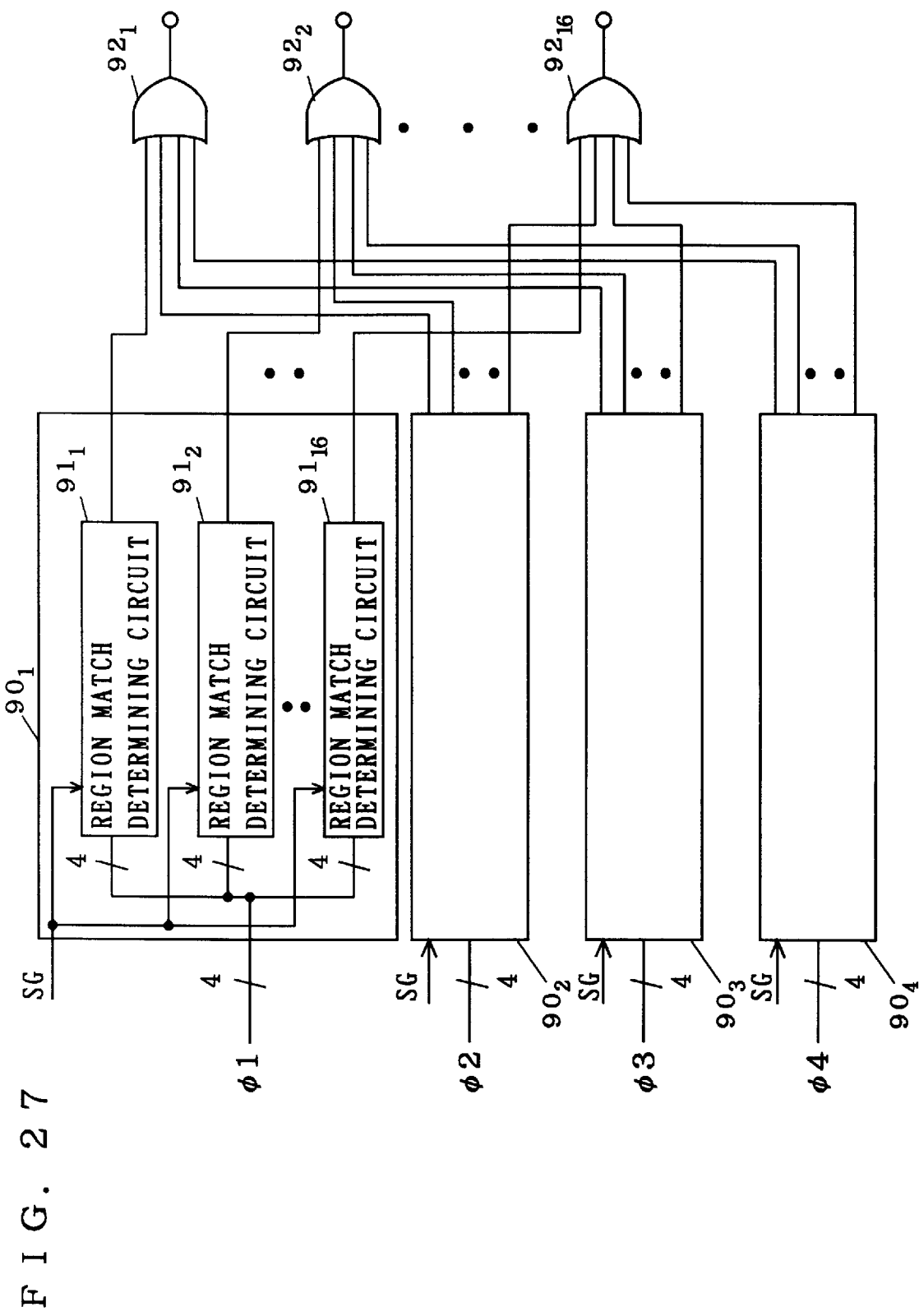
FIG. 27 is a block diagram showing an example of structure of the region deciding circuit.

FIG. 27 is a block diagram showing an example of the structure of the region deciding circuit. In FIG. 27, $90_1$–$90_4$ denote detecting portions for detecting regions of tangents φ1–φ4 of prediction phase errors, $91_1$–$91_{16}$ denote region match determining circuits provided to all of the detecting portions $90_1$–$90_4$ for determining whether a coincidence occurs with a certain value to determine whether a match exists with a certain region, $92_1$ denotes an OR gate for outputting OR of the outputs of the region match determining circuits $91_1$ of the detecting portions $90_1$–$90_4$, and $92_2$–$92_{16}$ denote OR gates for outputting OR of the outputs of the region match determining circuits $91_2$–$91_{16}$ of the detecting portions $90_1$–$90_4$.

When tangents φ1–φ4 of four prediction phase errors are provided as calculated results, the 16 outputs of all detecting portions $90_1$–$90_4$ are ORed for each region to set flags in the regions to which the tangents φ1–φ4 of the prediction phase errors belong. When only two tangents φ1 and φ2 of prediction phase errors are provided, for example, only two of the detecting portions $90_1$–$90_4$ are activated with the control signal SG so that only two of the 16 signal lines connected to the outputs of the OR gates $92_1$–$92_{16}$ attain "1."

This eliminates the necessity of processing 4-bit signal in hardware, reducing the circuit scale.

Figure 28:
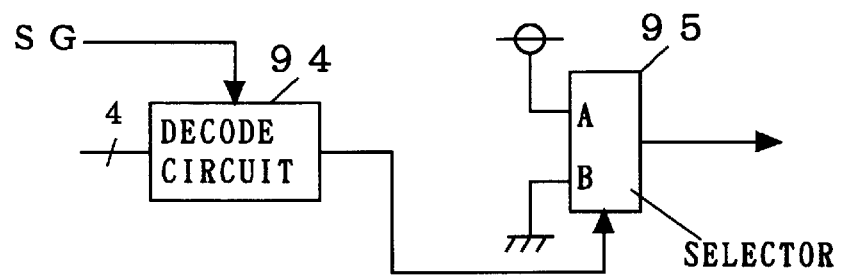
FIG. 28 is a block diagram showing an example of the structure of the region match determining circuit.
Figure 29:
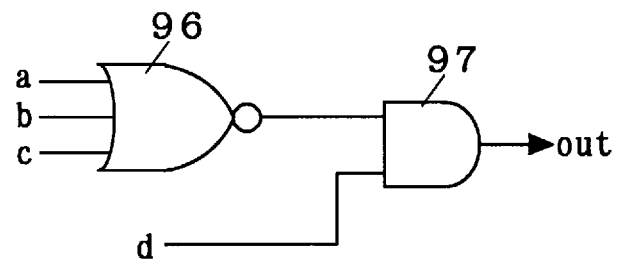
FIG. 29 is a block diagram showing an example of the structure of the decode circuit.

FIG. 28 is a block diagram showing an example of structure of the region match determining circuits $91_1$–$91_{16}$. In FIG. 28, 94 denotes a decode circuit for decoding 4-bit signal, and 95 denotes a selector for outputting a power-supply voltage or a ground voltage according to a result of decoding in the decode circuit 94. FIG. 29 shows a decode circuit which outputs "1" when only the bit d, among the bits a to d, is at "1." The decode circuit 94 is set to always output "0" with the control signal SG. In FIG. 29, 96 denotes a NOR gate outputting NOT-OR of the bits a–c and 97 denotes an AND gate outputting AND of the output of the NOR gate 96 and the bit d.

As shown in FIG. 24, disable signals are provided in regions where no tangent φi of prediction phase error exists to eliminate, in advance, the necessity of comparing all existential regions. This reduces processing time.

Figure 25:
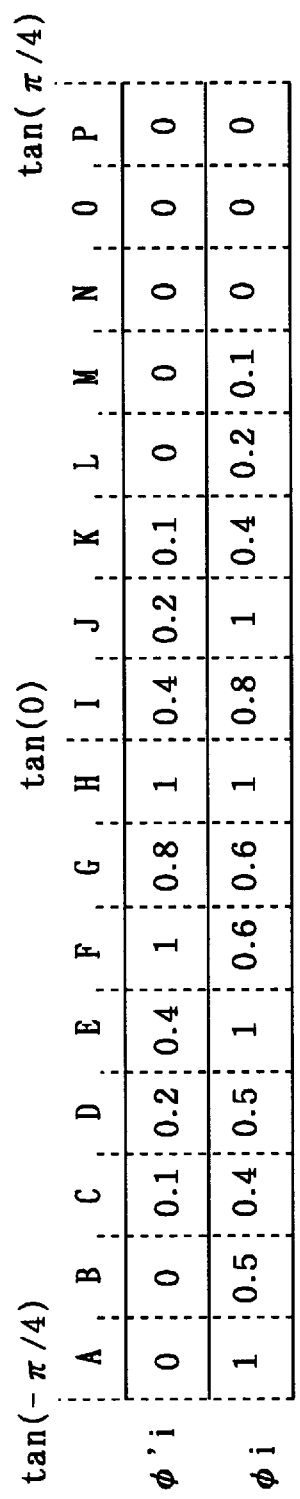
FIG. 25 is a diagram showing weighted flags set in the regions to which the phase errors are allocated.

On the other hand, as shown in FIG. 25, when weighted flags are set in regions which are located in the neighborhoods of regions where tangents ϕi of prediction phase errors exist, it can be readily determined which existential region is the nearest to the true value. For example, when one region is interposed between "1"s, "0.8" is provided to the region, when two regions are interposed between "1"s, "0.6" is provided to the regions, when three regions are interposed between "1"s, "0.4" is provided to the middle region and "0.5" is provided to the other regions, and when three regions are interposed between "1" and "0," "0.4," "0.2," and "0.1" are provided in the order from the one nearest to "1." Then the values of a tangent ϕ'i of a one-clock-before prediction phase error and a tangent ϕi of a current-time prediction phase error in corresponding regions are added and the region having the largest value is determined as the region where the phase error $\tan(\theta)$ exists. Then, even if no region is provided with "1" at the same time for the tangent ϕ'i of a one-clock-before prediction phase error and the tangent ϕi of a current-time prediction phase error, the region determining circuit 82 can easily determine the region close to "1" as the region to which the phase error belongs.

Figure 26:
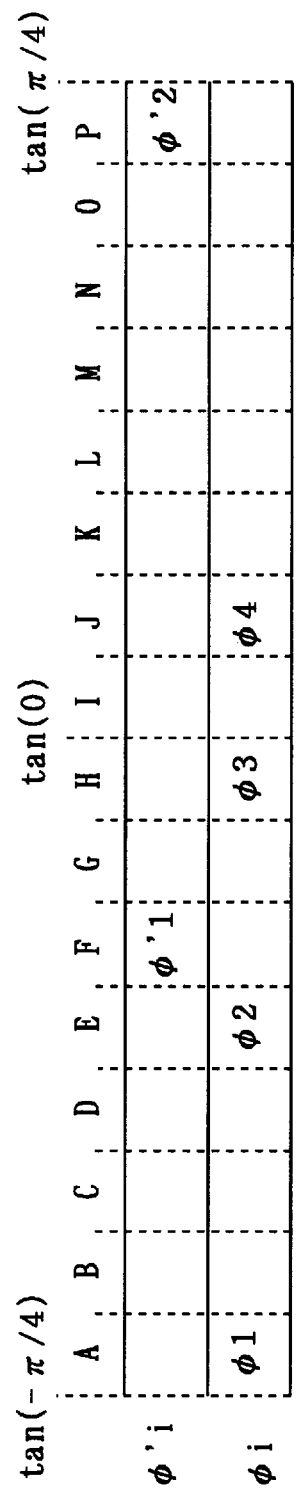
FIG. 26 is a diagram showing the phase error determination when the most distant regions A and P are handled as adjacent regions.

When an input signal has a large frequency error in Step ST27 of FIG. 19 and the input signal is rotated around the origin on the vector diagram, it is possible to deal with the rotation of input signal by handling the most distant regions A and P as nearby regions as shown in FIG. 26, enabling high speed determination of frequency error.

In this case, it is possible to analyze the phase error and the frequency error even with the same device, by analyzing in separated times, for example. First, the phase error is analyzed by using a plurality of patterns of tangents ϕi of prediction phase errors for certain times without handling the separated regions A and P as nearby regions. Next, handling the separated regions A and P as nearby regions, the frequency error is analyzed by using a plurality of patterns of tangents ϕi of prediction phase errors for certain times.

Handled are frequency errors not so large. For example, suppose that a match has continuously occurred in the region B three times and then in the region C twice in successive five patterns of ϕi. In the next successive five patterns of tangents ϕi of prediction phase errors, a match has continuously occurred in the region C three times and then in the region D twice. In this case, the phase has rotated by π/32 in five patterns. The not so large frequency errors handled herein include those which move one region at the most as the pattern changes once.

When a correct phase error is determined only by a comparison with a region determination result of one clock before, an erroneous determination may take place for lack of materials for determination. Determining a correct phase error by using region determination results for several clocks will reduce erroneous determinations and provide very accurate determination results. This system can be realized by using the majority logic in which region determination results for each clock are compared and the region of the largest number of matches is selected. This will be specifically explained in the example shown in FIG. 22. In the diagram, the time advances from the top to the bottom. That is to say, the next clock to a pattern 1 causes the region determination result to move to the next pattern 2. Considering the pattern 1 to the pattern 4, a match occurs in the region H in the determination results for four clocks, the largest number of matches. Accordingly, the ϕ located in the region H is determined to be a correct phase error in the pattern 4. If a correct phase error can not be determined by the majority logic above, like when the largest number of matches have occurred in a plurality of regions, the phase error correctly determined one clock before is outputted.

Figure 30:
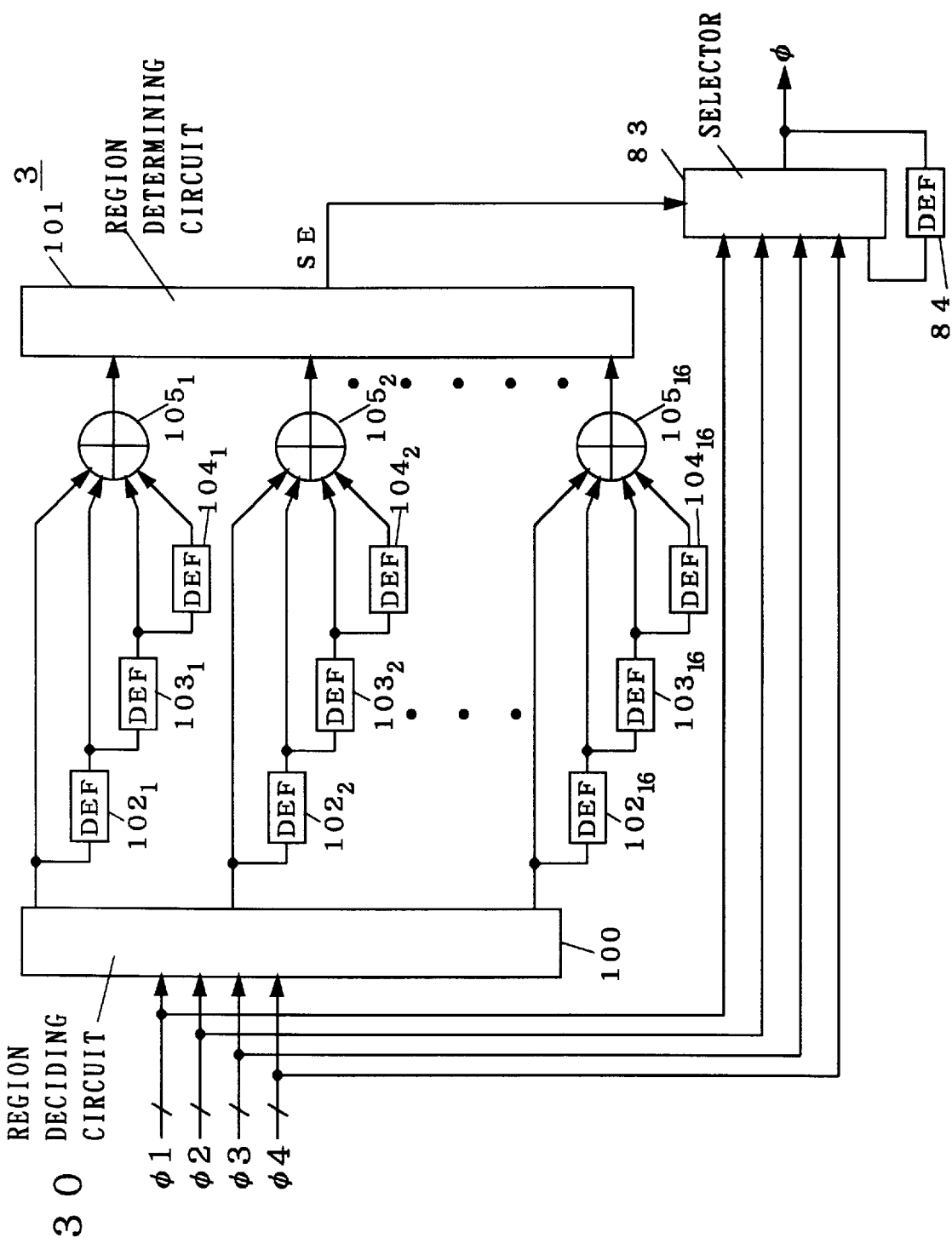
FIG. 30 is a block diagram showing the structure of the phase error determining circuit using majority logic.

Next, a phase error determining circuit using the majority logic will be explained referring to FIG. 30. In FIG. 30, 100 denotes a region deciding circuit having the structure shown in FIG. 27, for example, for determining to which of the regions A to P the tangents ϕ1 to ϕ4 of prediction phase errors belong, 101 denotes a region determining circuit for determining a region according to the majority logic from a plurality of patterns of allocation of regions determined in a plurality of times in the region deciding circuit 100 and outputting a select signal SE, $102_1$–$102_{16}$ denote D flip-flops for storing data about the regions A to P to store the pattern of region allocation of prediction phase errors of one clock before, $103_1$–$103_{16}$ denote D flip-flops for storing data about the regions A to P to store the pattern of region allocation of prediction phase errors of two clocks before, $104_1$–$104_{16}$ denote D flip-flops for storing data about the regions A to P to store the pattern of region allocation of prediction phase errors of three clocks before, $105_1$–$105_{16}$ denote adders for adding the data about the regions A to P and outputting it to the region determining circuit 101, and the parts shown at the same characters as those in FIG. 17 denote the corresponding parts in FIG. 17.

The adder $105_1$ adds the data, outputted from the region deciding circuit 100, indicative of whether there currently exists a predictive phase error which belongs to the region A and the data held in the D flop-flops $102_1$–$104_1$. Similarly, the adder $105_2$ adds the data, outputted from the region deciding circuit 100, indicative of whether there currently exists a predictive phase error which belongs to the region B and the data held in the D flop-flops $102_2$–$104_2$, and the adder $105_{16}$ adds the data, outputted from the region deciding circuit 100, indicative of whether there currently exists a predictive phase error which belongs to the region P and the data held in the D flop-flops $102_{16}$–$104_{16}$.

The region determining circuit 101 outputs a select signal SE so that the region with the largest value of data among the outputs from $105_1$–$105_{16}$ is estimated and selected as a phase error for the actually-transmitted symbol.

The phase error determining circuit shown in FIG. 30, which determines phase errors by the majority logic, has increased accuracy.

Figure 31:
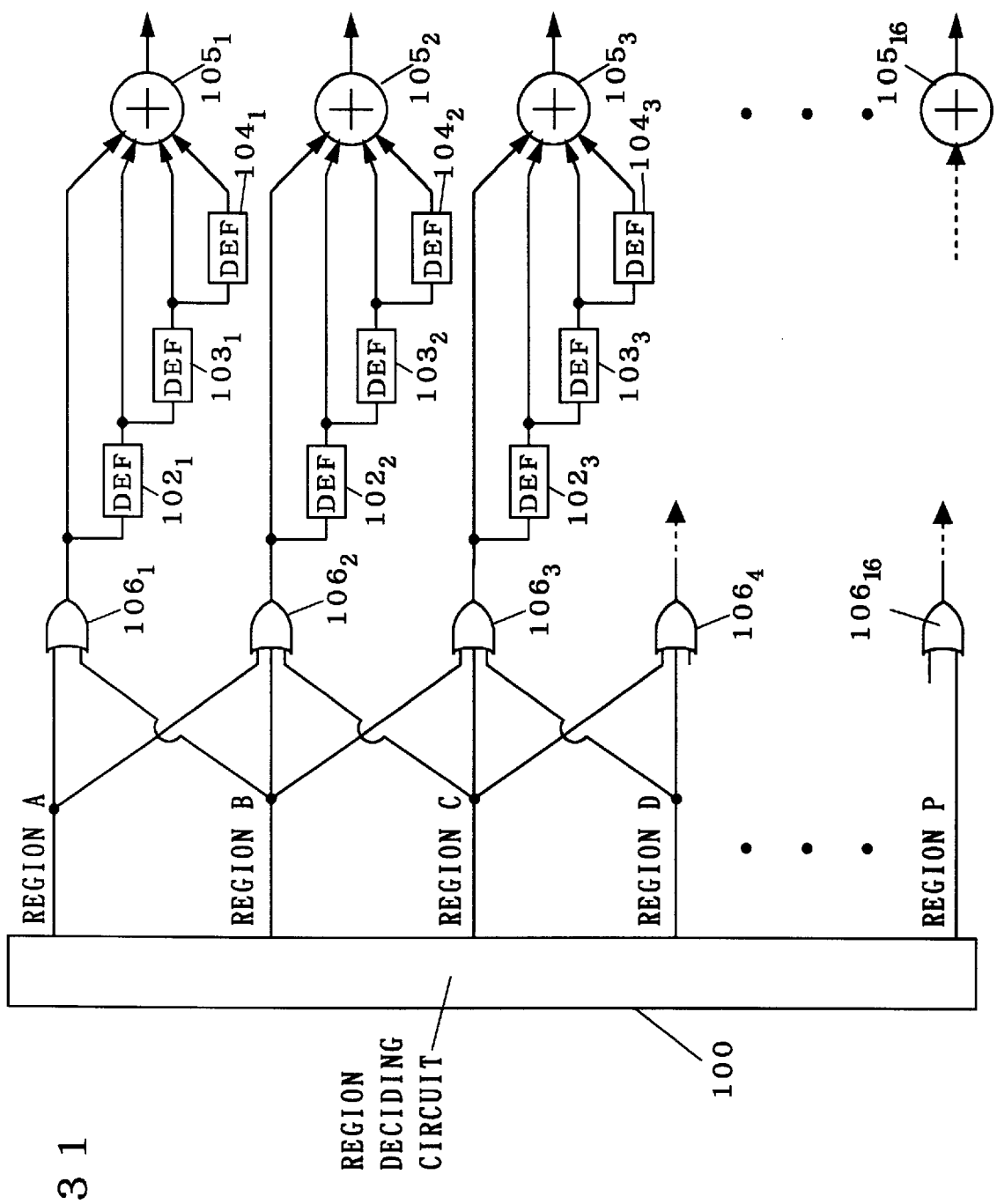
FIG. 31 is a block diagram showing part of the structure of the phase error determining circuit which determines phase errors considering adjacent regions as well.

FIG. 31 is a block diagram showing part of the structure of a phase error determining circuit which determines phase errors considering adjacent regions as well. The phase error determining circuit shown in FIG. 31 includes OR gates $106_1$–$106_{16}$ for converting the data about the regions A to P in FIG. 30, whose outputs are processed in the D flip-flops $102_1$–$102_{16}$, the D flip-flops $103_1$–$103_{16}$, the D flip-flops, $104_1$–$104_{16}$, and the adders $105_1$–$105_{16}$.

The OR gates $106_1$–$106_{16}$ are connected to the outputs of the region deciding circuit 100 to provide ORs of the data of the respective corresponding regions and the adjacent regions. For example, the adder $106_3$ ORs the data about the corresponding region C, the data about the adjacent region B, and the data about the region D.

At this time, the region determining circuit 101 determines the region having the largest value in the outputs of the adders $105_1$–$105_{16}$ as a region to which the phase error belongs. However, if "1" is continuously inputted to the region C four times and "0" is continuously inputted to the regions B and D, for example, a special determination is required. In this case, the outputs of the adders $105_2$–$105_4$ are all 4. Then, the region determining circuit 101 outputs the select signal SE to output the phase error which belongs to the region corresponding to the output of the middle one of the adders outputting the same largest value. When the regions A and B or the regions O and P both output the largest value, the region determining circuit 101 generates the select signal SE so that the phase error belonging to the end region A, P is outputted. This eliminates influence of variation of data, increasing the accuracy of determination of phase errors.

Figure 32:
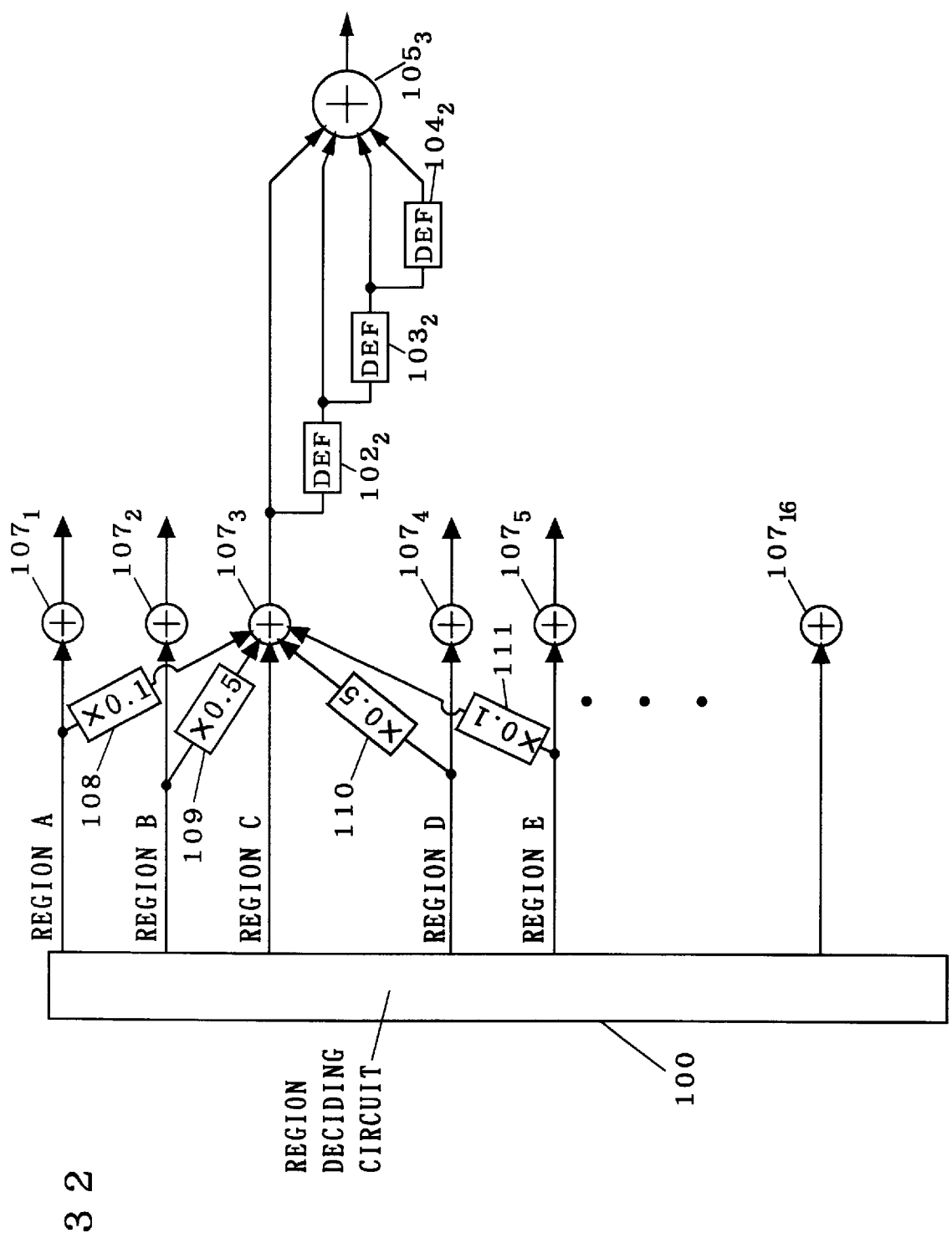
FIG. 32 is a block diagram showing another structure of the phase error determining circuit, mainly showing the part relating to the region C.

FIG. 32 is a block diagram showing a modification of FIG. 30, which mainly shows the part related to the region C. As shown in FIG. 32, the data to be added in the adders 107$_1$–107$_{16}$ may be weighted. The adders 107$_1$–107$_{16}$ are provided corresponding to data about the regions A to P outputted from the region deciding circuit 100. In order to modify the data about the region C, the adder 107$_3$ provided corresponding to the region C is supplied with the data about the region A multiplied by 0.1 by the coefficient multiplier 108, the data about the region B multiplied by 0.5 by the coefficient multiplier 109, the data about the region C as it is, the data about the region D multiplied by 0.5 by the coefficient multiplier 110, and the data about the region E multiplied by 0.1 by the coefficient multiplier 111.

With this structure, even if "1" is inputted continuously only to the region C among the regions A to F, for example, the data about the region B and the region D after conversion are smaller than the data about the region C, which simplifies the procedure for determining regions, in the region determining circuit 101, providing simplified structure of the region determining circuit 101.

Figure 34:
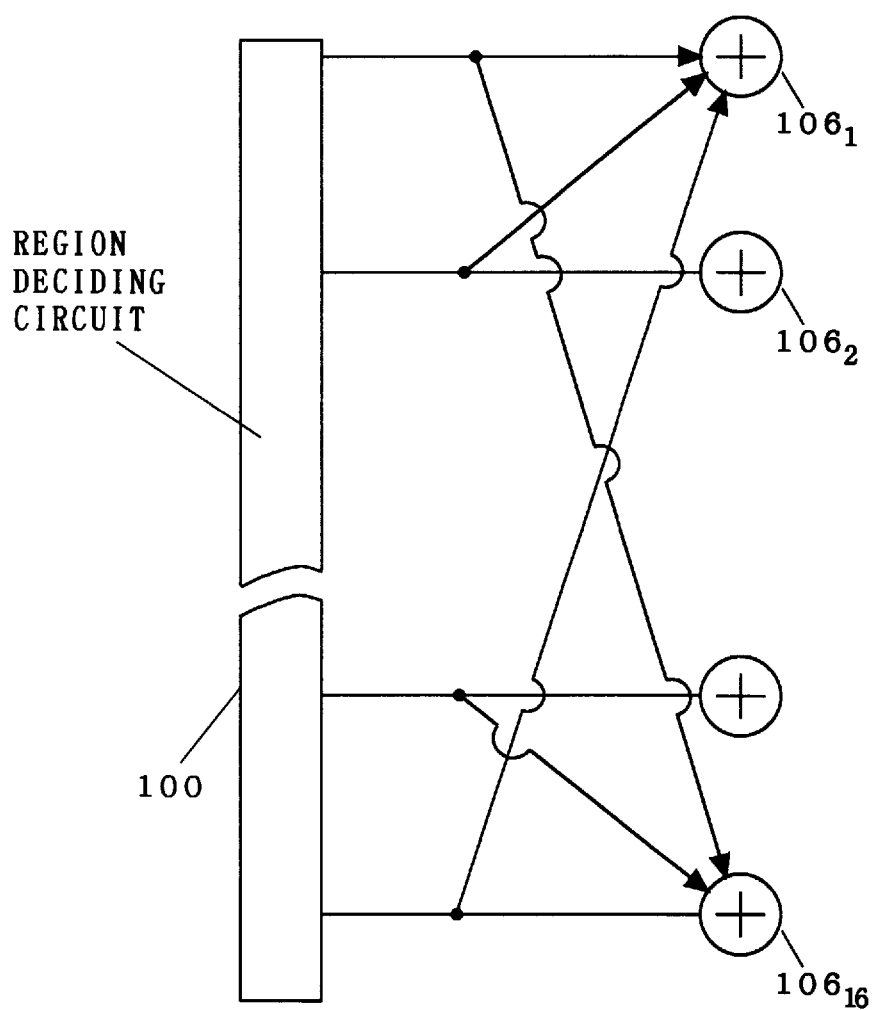
FIG. 34 is a block diagram showing part of another structure of the phase error determining circuit which determines phase errors taking the adjacent regions into consideration.

When data of the regions A to P are converted as shown in FIG. 31 or FIG. 32, it is sometimes better, when inverting frequency errors, for example, to consider the end regions A and P to be adjacent to each other. In this case, in the case of FIG. 31, as shown in FIG. 34, the adder 106$_1$ provided to convert the data about the region A is supplied with the data about the region P, the data about the region A and the data about the region B.

Figure 33:
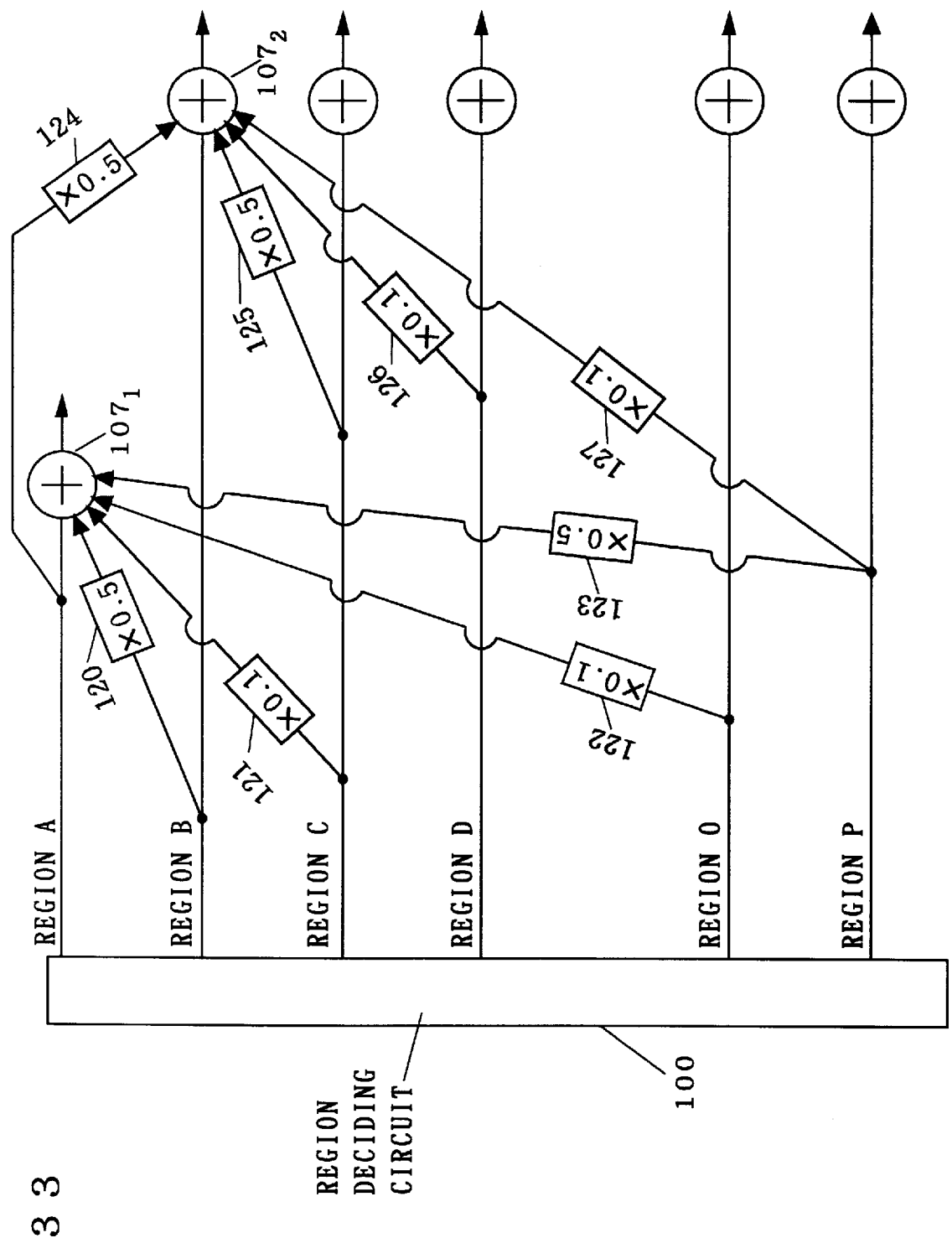
FIG. 33 is a block diagram showing part of another structure of the phase error determining circuit which determines phase errors also considering adjacent regions.

In the case of FIG. 32, as shown in FIG. 33, the adder 107$_3$, for example, provided corresponding to the end region A for converting the data about the region A, is supplied with the data about the region A as it is, the data about the region B multiplied by 0.5 by the coefficient multiplier 120, the data about the region C multiplied by 0.1 by the coefficient multiplier 121, the data about the region 0 multiplied by 0.1 by the coefficient multiplier 122, and the data about the region P multiplied by 0.5 by the coefficient multiplier 123.

For the region B, the adder 107$_2$ provided corresponding to the region B for converting the data about the region B is supplied with the data about the region A multiplied by 0.5 by the coefficient multiplier 124, the data about the region B as it is, the data about the region C multiplied by 0.5 by the coefficient multiplier 125, the data about the region D multiplied by 0.1 by the coefficient multiplier 126, and the data about the region P multiplied by 0.1 by the coefficient multiplier 127.

Thus relating the data of a region at an end or near an end to the region at the other end or near the other end allows all regions to be equally handled, which makes the processing of the phase detector easy even when the angle relating to the error rotates.

A method for obtaining the phase error more accurately will be considered. First, the existential regions of $\tan(\theta)$ are considered. The region $-1 \leq \tan(\theta) < 1$ is divided into n and it is found to which regions the at most four kinds of predicted phase errors belong. At this time, to separate the errors, two or more predictive values can not exist in the same divided region. An n satisfying this condition will be obtained.

$$i = A\cos(\theta) + B\sin(\theta)$$

$$q = -A\sin(\theta) + B\cos(\theta)$$

$$i^2 + q^2 = A^2 + B^2 \tag{3}$$

Then, $$\tan\theta = \frac{bi - aq}{ai + bq} \tag{4}$$

$((a, b)$ is $(|A|, |B|)$ or $(|B|, |A|))$

That is to say, the predicted phase error is as follows:

$$\tan(\theta\alpha) = \frac{|B|i - |A|q}{|A|i + |B|q} \tag{5}$$

$$\tan(\theta\beta) = \frac{|A|i - |B|q}{|B|i + |A|q}$$

Consider the case in which (A, B) is in the quadrants I and III.

$$\begin{aligned}\tan(\theta\alpha) &= \frac{Bi - Aq}{Ai + Bq} \\ &= \frac{-Bi - (-A)q}{-Ai + (-B)q} \\ &= \tan(\theta)\end{aligned} \tag{6}$$

On the other hand, two kinds of $\tan(\theta\beta)$ are possible.

$$\begin{aligned}\tan(\theta\beta) &= \frac{Ai - Bq}{Bi + Aq} \\ &= \frac{\tan(\theta) - \frac{B^2 - A^2}{2AB}}{1 + \tan(\theta) \cdot \frac{(B^2 - A^2)}{2AB}}\end{aligned} \tag{7}$$

Then, when $\tan(\zeta) = (B^2 - A^2)/2AB$, then $\tan(\theta\beta) = \tan(\theta - \zeta)$. When $|\zeta|$ is minimum, $\tan(\theta\alpha)$ and $\tan(\theta\beta)$ take the closest values. The $\tan(\zeta)$ is a monotonously increasing function, passing the origin, so that $|\tan(\zeta)|$ becomes minimum when $|\zeta|$ is minimum. For the minimum value of $|\tan(\zeta)|$, A=13, B=15 are substituted.

When $\min(|\tan(\zeta)|) = 0.143589744$, then $\theta\beta = \theta - 8.171233582981°$.

Figure 35:
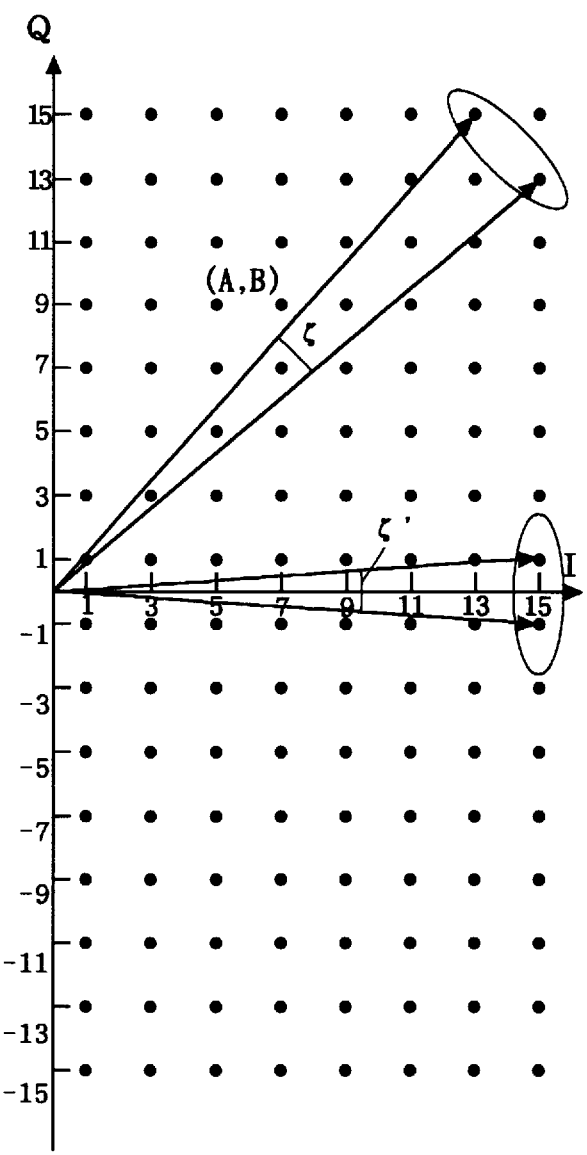
FIG. 35 is a graph showing vector arrangement of 256 QAM for use in describing the relation between the regions and the symbols.

The angle shown as $\zeta$ in the quadrants I, II in the symbol arrangement diagram shown in FIG. 35 is equal to 8.171233582981°.

$$\begin{aligned}\tan(\theta\beta) &= \frac{Bi - Aq}{Ai + Bq} \\ &= \frac{\tan(\theta) + \frac{2AB}{B^2 - A^2}}{1 + \tan(\theta) \cdot \frac{2AB}{(B^2 - A^2)}}\end{aligned} \tag{8}$$

Here, if $\tan(\zeta') = 2AB/(B^2 - A^2)$, $$\tan(\theta\beta) = \tan(\theta + \zeta')$$

When $|\zeta|$ is minimum, $\tan(\theta\alpha)$ and $\tan(\theta\beta)$ take the closest values. The $\tan(\zeta)$ is a monotonously increasing function, passing the origin, so that $|\tan(\zeta)|$ becomes minimum when $|\zeta|$ minimum. For the minimum value of $|\tan(\zeta')|$, A=1, B=15 are substituted.

When the $\min(|\tan(\zeta')|) = 0.133928571$, then $\theta\beta = \theta + 7.62814964458°$.

The angle shown as ζ' in the quadrants I, II in the symbol arrangement diagram shown in FIG. 35 is equal to 7.62814964458°.

From the above-mentioned results, the phase angle range for each region must be smaller than tan(7.62814964458°). When the number of division, n, of tan(θ) is 16, then arc tan(²/₁₆)=7.1250 . . . °<ζmin This satisfies the condition. The same result is obtained when (A, B) is in the quadrants II and IV. Accordingly, n can be 16. Thus the number of division and divided existential regions for tan(θ) have been determined.

While the invention has been described in detail, the foregoing description is in all aspects illustrative and not restrictive. It is understood that numerous other modifications and variations can be devised without departing from the scope of the invention.

What is claimed is:

1. A phase detector comprising:
    ideal symbol estimating means for estimating, from a power of a carrier or an amplitude of the carrier transmitting a signal, to which ideal symbol an actually-received symbol transmitted by the carrier corresponded at the time of transmission;
    prediction phase detecting means for obtaining a plurality of prediction phase errors from a plurality of ideal symbols estimated to be those at the time of transmission by said ideal symbol estimating means and said actually-received symbol; and
    phase error determining means for determining a phase error to be outputted as a phase error for an actually-transmitted symbol from among the plurality of prediction phase errors obtained by said prediction phase detecting means.

2. The phase detector according to claim 1, wherein said carrier includes first and second carriers orthogonal to each other,
    said phase detector further comprising operating means for calculating, from data about said first and second carriers, a power of the carriers or an amplitude of the carriers which is provided to said ideal symbol estimating means.

3. The phase detector according to claim 2, wherein said ideal symbol estimating means comprises storage means storing data about ideal symbols corresponding to the powers of said carriers or the amplitudes of said carriers at addresses corresponding to the powers or amplitudes,
    wherein the data about the ideal symbol corresponding to the power of the carriers or the amplitude of the carriers outputted from said operating means is directly outputted from said storage means.

4. The phase detector according to claim 2, further comprising nearby point determining means for converting the power of the carriers or the amplitude of the carriers of the actually-received symbol outputted from said operating means into a power of carriers or an amplitude of carriers of an ideal symbol which is the closest to the power of the carriers or the amplitude of the carriers of the actually-received symbol.

5. The phase detector according to claim 1, wherein said prediction phase detecting means limits the range of said prediction phase errors in the range of not less than $(-\pi/4)$ and not more than $(\pi/4)$, seen from said actually-received symbol.

6. The phase detector according to claim 5, wherein said prediction phase detecting means comprises phase error calculating means which, when coordinates of an ideal symbol estimated by said ideal symbol estimating means are taken as (A, B) and coordinates of the actually-received symbol are taken as (i, q) (where A, B, i, q are absolute values), calculates ((Axi−Bxq)/(Axi+Bxq)) and ((Axq−Bxi)/(Axi+Bxq)), and if a result of the calculation is larger than 1, takes a reciprocal of the result and multiplies the reciprocal by −1 to calculate a phase error.

7. The phase detector according to claim 6, wherein said prediction phase detecting means comprises,
    comparing means for calculating the numerators and the denominators of ((Axi−Bxq)/(Axi+Bxq)) and ((Axq−Bxi)/(Axi+Bxq)) and comparing the numerators and the denominators in magnitude,
    dividing means for performing division with the numerators and the denominators of the expressions exchanged so that the result of the calculation provides an output not larger than 1 according to the result of the comparison by said comparing means, and
    sign inverting means for inverting the sign of the output of said dividing means.

8. The phase detector according to claim 6, wherein said prediction phase detecting means comprises a calculating portion for calculating ((Axi−Bxq)/(Axi+Bxq)),
    wherein the values of A and B are exchanged and outputted to said calculating portion to calculate two kinds of prediction phase errors.

9. The phase detector according to claim 1, wherein said phase error calculating means performs operation at a rate twice, or more, that of inputting the data about said plurality of ideal symbols and the data about said actually-received symbol to perform calculations of the plurality of symbols in series.

10. The phase detector according to claim 1, wherein said phase error determining means compares prediction phase errors obtained at different times, among said plurality of prediction phase errors outputted from said prediction phase detecting means, to output a prediction phase error having the smallest difference between prediction phase errors as a phase error.

11. The phase detector according to claim 10, wherein said phase error determining means detects a plurality of prediction phase errors at a plurality of different times in a plurality of regions obtained by dividing the range from $\pi/4$ to $-\pi/4$ into regions not larger than the minimum phase interval of said ideal symbols, allocates said plurality of prediction phase errors into said plurality of regions for each time, and compares states of the individual regions at successive times in which said plurality of prediction phase errors are allocated to determine a phase error.

12. The phase detector according to claim 11, wherein said phase error determining means uses regions obtained by dividing the range from $\pi/4$ to $-\pi/4$ equally into 16 as said plurality of regions when the number of said ideal symbols is 256 or smaller.

13. The phase detector according to claim 11, wherein said phase error determining means comprises a plurality of decoding means provided in correspondence with said plurality of regions, and
    further comprises region match determining means for setting flags for differentiation in the regions into which the prediction phase errors are allocated by decoding said plurality of prediction phase errors in said plurality of decoding means.

14. The phase detector according to claim 13, wherein said phase error determining means determines a phase error by using majority logic in which a region in which a flag is set for the longest time is selected and outputs a preceding determination result when a determination can not be made by said majority logic.

15. The phase detector according to claim 14, wherein said phase error determining means determines a phase error considering states of flags set in nearby regions as well.

16. The phase detector according to claim 15, wherein said phase error determining means determines a phase error by applying the majority logic considering states of flags in nearby regions when no region has the flags set at adjacent times.

17. The phase detector according to claim 15, wherein said phase error determining means is able to select whether to handle the largest region and the smallest region as adjacent regions or as distant regions when making a determination considering nearby regions.

* * * * *